(12) United States Patent

Fujishiro et al.

(10) Patent No.: US 12,697,842 B2

(45) Date of Patent: Aug. 4, 2026

(54) TIRE

(71) Applicant: The Yokohama Rubber Co., LTD.,
Kanagawa (JP)

(72) Inventors: Masayuki Fujishiro, Kanagawa (JP);
Hiraku Koda, Kanagawa (JP); **Haruka
Tateno**, Kanagawa (JP)

(73) Assignee: The Yokohama Rubber Co., LTD.,
Tokyo (JP)

( * ) Notice: Subject to any disclaimer, the term of this
patent is extended or adjusted under 35
U.S.C. 154(b) by 107 days.

(21) Appl. No.: 18/552,364

(22) PCT Filed: Mar. 30, 2022

(86) PCT No.: PCT/JP2022/016197
§ 371 (c)(1),
(2) Date: Sep. 25, 2023

(87) PCT Pub. No.: WO2022/210943
PCT Pub. Date: Oct. 6, 2022

(65) Prior Publication Data
US 2024/0059101 A1 Feb. 22, 2024

(30) Foreign Application Priority Data

Mar. 30, 2021 (JP) ................................. 2021-057877

(51) Int. Cl.
B60C 9/02 (2006.01)
B60C 9/00 (2006.01)
(Continued)

(52) U.S. Cl.
CPC .......... B60C 9/0042 (2013.01); B60C 9/2003
(2013.01); B60C 2009/0085 (2013.01);
(Continued)

(58) Field of Classification Search
CPC ....... B60C 1/00; B60C 1/0041; B60C 1/0008;
B60C 5/14; B60C 2009/0425; B60C
2009/0269; B60C 2009/0284
See application file for complete search history.

(56) References Cited

U.S. PATENT DOCUMENTS 4,718,470 A * 1/1988 Kusakabe ............. B60C 9/0007
57/902
6,318,431 B1 * 11/2001 Ueyoko .................... B60C 3/04
152/554
(Continued)

FOREIGN PATENT DOCUMENTS

EP 679543 B1 * 10/1997 ........... B60C 9/2006
GB 2224703 A * 5/1990 ............... B60C 3/04
(Continued)

*Primary Examiner* — Cedrick S Williams

(74) *Attorney, Agent, or Firm* — Thorpe North & Western
, LLP

(57) ABSTRACT

In a tire, a tire outer diameter OD is in a range 200
mm≤OD≤660 mm. A total tire width SW is in a range 100
mm≤SW≤400 mm. A carcass layer is formed by layering
two layers of carcass plies formed by covering organic fiber
cords with coating rubbers. The organic fiber cords of the
two layers of the carcass plies have cord angles in a range
of 80 degrees or more and 100 degrees or less with respect
to a tire circumferential direction. A tensile strength Tcs per
a width of 50 mm of each of the two layers of the carcass
plies (13A, 13B) is in a range 17 N/mm≤Tcs/OD≤120 N/mm
with respect to the tire outer diameter OD.

12 Claims, 20 Drawing Sheets

(51) Int. Cl.
  *B60C 9/20* (2006.01)
  *B60C 9/04* (2006.01)

(52) U.S. Cl.
  CPC ................. *B60C 2009/0276* (2013.01); *B60C 2009/0284* (2013.01); *B60C 2009/0425* (2013.01); *B60C 2009/045* (2013.01); *B60C 2009/0458* (2013.01); *B60C 2009/0475* (2013.01); *B60C 2009/2022* (2013.01); *B60C 2009/2064* (2013.01); *B60C 2009/2067* (2013.01); *B60C 2009/2077* (2013.01); *B60C 2009/209* (2013.01); *B60C 2009/2093* (2013.01)

(56) References Cited

U.S. PATENT DOCUMENTS

2014/0138003 A1* 5/2014 Kuwayama ............... B60C 3/04
                                                                152/454

FOREIGN PATENT DOCUMENTS

| | | | | |
|---|---|---|---|---|
| JP | 62-1601 | A | 1/1987 | |
| JP | 1-240305 | A | 9/1989 | |
| JP | 7-81308 | A | 3/1995 | |
| JP | 2659729 | B2 * | 9/1997 | ......... B60C 15/0045 |
| JP | 2007-118850 | A | 5/2007 | |
| JP | 2010-133796 | A | 6/2010 | |
| JP | 2014-218096 | A | 11/2014 | |
| JP | 2015-36277 | A | 2/2015 | |
| JP | 2016-78510 | A | 5/2016 | |
| JP | 2019051849 | A * | 4/2019 | |
| RU | 2712475 | C1 * | 1/2020 | ............... B60C 9/04 |
| WO | 2011/074676 | A1 | 6/2011 | |
| WO | 2020/122169 | A1 | 6/2020 | |

| | | | | |
|---|---|---|---|---|
| 2017/0274710 | A1* | 9/2017 | Matsumoto ........... | B60C 9/2204 |
| 2017/0297376 | A1* | 10/2017 | Ito ............................. | B60C 9/20 |
| 2019/0153193 | A1* | 5/2019 | Crepin-Leblond ..... | C01B 33/22 |

\* cited by examiner

| | Comparative Example | Example 1 | Example 2 | Example 3 | Example 4 |
|---|---|---|---|---|---|
| Tire structure | - | FIG. 10 | FIG. 10 | FIG. 10 | FIG. 10 |
| OD (mm) | 531 | 531 | 531 | 531 | 547 |
| SW (mm) | 143 | 143 | 143 | 143 | 143 |
| TW (mm) | 123 | 123 | 123 | 123 | 130 |
| RD (mm) | 305 | 305 | 305 | 305 | 305 |
| SW/OD | 0.27 | 0.27 | 0.27 | 0.27 | 0.26 |
| TW/SW | 0.86 | 0.86 | 0.86 | 0.86 | 0.91 |
| Number of carcass plies | 1 | 2 | 2 | 2 | 2 |
| Material of carcass cord | Polyester fiber | Polyester fiber | Polyester fiber | Polyester fiber | Polyester fiber |
| Tcs/OD | 11 | 19 | 30 | 110 | 29 |
| Hcs/SH | 0.48 | 0.44 | 0.44 | 0.44 | 0.41 |
| Hcs'/SH | 0.10 | 0.06 | 0.06 | 0.06 | 0.06 |
| Belt structure | - | - | - | - | - |
| Supplemental belt | Absent | Absent | Absent | Absent | Absent |
| Material of belt cord | Aramid fiber | Aramid fiber | Aramid fiber | Aramid fiber | Aramid fiber |
| Tbt/OD | 23 | 23 | 23 | 23 | 22 |
| TL/OD | 0.0009 | 0.0009 | 0.0009 | 0.0009 | 0.0024 |
| TCSU/TL | 1.200 | 1.200 | 1.200 | 1.200 | 0.385 |
| MC (MPa) | 1.30 | 1.30 | 1.30 | 1.30 | 3.00 |
| MC/MIL | 0.87 | 0.87 | 0.87 | 0.87 | 2.00 |
| MB/MC | 2.69 | 2.69 | 2.69 | 2.69 | 2.13 |
| TC × tanδ | 0.50 | 0.50 | 0.50 | 0.50 | 0.10 |
| Hpp/TCB | 67 | 67 | 67 | 67 | 200 |
| Hb_sh/Hb_ce | 1.00 | 1.00 | 1.00 | 1.00 | 1.40 |
| DA/TW | 0.053 | 0.061 | 0.061 | 0.061 | 0.053 |
| CRw/TRw | 1.00 | 1.50 | 1.50 | 1.50 | 0.99 |
| Tsh/Tce | 1.08 | 0.59 | 0.59 | 0.59 | 1.00 |
| Tsh/Tu | 7.00 | 7.42 | 7.42 | 7.42 | 6.53 |
| Low rolling resistance performance | 100 | 107 | 105 | 100 | 111 |
| Wear resistance performance | 100 | 103 | 105 | 110 | 126 |
| Durability performance | 100 | 105 | 105 | 105 | 131 |

FIG. 12A

| | Example 5 | Example 6 | Example 7 | Example 8 | Example 9 |
|---|---|---|---|---|---|
| Tire structure | FIG. 10 | FIG. 10 | FIG. 10 | FIG. 10 | FIG. 10 |
| OD (mm) | 480 | 464 | 531 | 531 | 531 |
| SW (mm) | 235 | 235 | 143 | 143 | 143 |
| TW (mm) | 180 | 191 | 123 | 123 | 123 |
| RD (mm) | 254 | 254 | 305 | 305 | 305 |
| SW/OD | 0.49 | 0.51 | 0.27 | 0.27 | 0.27 |
| TW/SW | 0.77 | 0.81 | 0.86 | 0.86 | 0.86 |
| Number of carcass plies | 2 | 2 | 2 | 2 | 2 |
| Material of carcass cord | Polyester fiber | Polyester fiber | Polyester fiber | Polyester fiber | Polyester fiber |
| Tcs/OD | 33 | 34 | 30 | 30 | 30 |
| Hcs/SH | 0.44 | 0.48 | 0.51 | 0.59 | 0.78 |
| Hcs'/SH | 0.06 | 0.07 | 0.06 | 0.06 | 0.06 |
| Belt structure | - | - | - | - | - |
| Supplemental belt | Absent | Absent | Absent | Absent | Absent |
| Material of belt cord | Aramid fiber | Aramid fiber | Aramid fiber | Aramid fiber | Aramid fiber |
| Tbt/OD | 25 | 26 | 23 | 23 | 23 |
| TL/OD | 0.0027 | 0.0028 | 0.0009 | 0.0009 | 0.0009 |
| TCSU/TL | 0.385 | 0.462 | 1.200 | 1.200 | 1.200 |
| MC (MPa) | 3.00 | 3.00 | 1.30 | 1.30 | 1.30 |
| MC/MIL | 2.00 | 2.00 | 0.87 | 0.87 | 0.87 |
| MB/MC | 2.13 | 2.13 | 2.69 | 2.69 | 2.69 |
| TC × tanδ | 0.10 | 0.10 | 0.50 | 0.50 | 0.50 |
| Hpp/TCB | 200 | 200 | 67 | 67 | 67 |
| Hb_sh/Hb_ce | 1.40 | 1.40 | 1.00 | 1.00 | 1.00 |
| DA/TW | 0.053 | 0.053 | 0.061 | 0.061 | 0.061 |
| CRw/TRw | 1.35 | 1.35 | 1.50 | 1.50 | 1.50 |
| Tsh/Tce | 0.88 | 0.88 | 0.59 | 0.59 | 0.59 |
| Tsh/Tu | 2.36 | 2.36 | 7.42 | 7.42 | 7.42 |
| Low rolling resistance performance | 117 | 118 | 105 | 104 | 102 |
| Wear resistance performance | 120 | 119 | 105 | 105 | 105 |
| Durability performance | 133 | 133 | 106 | 108 | 109 |

FIG. 12B

| | Example 10 | Example 11 | Example 12 | Example 13 | Example 14 |
|---|---|---|---|---|---|
| Tire structure | FIG. 10 | FIG. 10 | FIG. 10 | FIG. 10 | FIG. 10 |
| OD (mm) | 531 | 531 | 531 | 531 | 531 |
| SW (mm) | 143 | 143 | 143 | 143 | 143 |
| TW (mm) | 123 | 123 | 123 | 123 | 123 |
| RD (mm) | 305 | 305 | 305 | 305 | 305 |
| SW/OD | 0.27 | 0.27 | 0.27 | 0.27 | 0.27 |
| TW/SW | 0.86 | 0.86 | 0.86 | 0.86 | 0.86 |
| Number of carcass plies | 2 | 2 | 2 | 2 | 2 |
| Material of carcass cord | Polyester fiber | Polyester fiber | Polyester fiber | Polyester fiber | Polyester fiber |
| Tcs/OD | 30 | 30 | 30 | 30 | 30 |
| Hcs/SH | 0.59 | 0.59 | 0.59 | 0.59 | 0.59 |
| Hcs'/SH | 0.09 | 0.29 | 0.29 | 0.29 | 0.29 |
| Belt structure | - | - | - | - | - |
| Supplemental belt | Absent | Absent | Absent | Absent | Absent |
| Material of belt cord | Aramid fiber | Aramid fiber | Steel | Steel | Steel |
| Tbt/OD | 23 | 23 | 28 | 84 | 232 |
| TL/OD | 0.0009 | 0.0009 | 0.0009 | 0.0009 | 0.0009 |
| TCSU/TL | 1.200 | 1.200 | 1.200 | 1.200 | 1.200 |
| MC (MPa) | 1.30 | 1.30 | 1.30 | 1.30 | 1.30 |
| MC/MIL | 0.87 | 0.87 | 0.87 | 0.87 | 0.87 |
| MB/MC | 2.69 | 2.69 | 2.69 | 2.69 | 2.69 |
| TC × tanδ | 0.50 | 0.50 | 0.50 | 0.50 | 0.50 |
| Hpp/TCB | 67 | 67 | 67 | 67 | 67 |
| Hb_sh/Hb_ce | 1.00 | 1.00 | 1.00 | 1.00 | 1.00 |
| DA/TW | 0.061 | 0.061 | 0.061 | 0.061 | 0.061 |
| CRw/TRw | 1.50 | 1.50 | 1.50 | 1.50 | 1.50 |
| Tsh/Tce | 0.59 | 0.59 | 0.59 | 0.59 | 0.59 |
| Tsh/Tu | 7.42 | 7.42 | 7.42 | 7.42 | 7.42 |
| Low rolling resistance performance | 105 | 108 | 108 | 107 | 103 |
| Wear resistance performance | 105 | 105 | 106 | 108 | 110 |
| Durability performance | 108 | 107 | 109 | 109 | 109 |

FIG. 12C

| | Example 15 | Example 16 | Example 17 | Example 18 | Example 19 | Example 20 |
|---|---|---|---|---|---|---|
| Tire structure | FIG. 1 | FIG. 1 | FIG. 1 | FIG. 1 | FIG. 1 | FIG. 1 |
| OD (mm) | 531 | 531 | 531 | 531 | 531 | 531 |
| SW (mm) | 143 | 143 | 143 | 143 | 143 | 143 |
| TW (mm) | 123 | 123 | 123 | 123 | 123 | 123 |
| RD (mm) | 305 | 305 | 305 | 305 | 305 | 305 |
| SW/OD | 0.27 | 0.27 | 0.27 | 0.27 | 0.27 | 0.27 |
| TW/SW | 0.86 | 0.86 | 0.86 | 0.86 | 0.86 | 0.86 |
| Number of carcass plies | 2 | 2 | 2 | 2 | 2 | 2 |
| Material of carcass cord | Polyester fiber | Polyester fiber | Polyester fiber | Polyester fiber | Polyester fiber | Polyester fiber |
| Tcs/OD | 30 | 30 | 30 | 30 | 30 | 30 |
| Hcs/SH | 0.59 | 0.59 | 0.59 | 0.59 | 0.59 | 0.59 |
| Hcs'/SH | 0.29 | 0.29 | 0.29 | 0.29 | 0.29 | 0.29 |
| Belt structure | FIG. 3 | FIG. 3 | FIG. 3 | FIG. 3 | FIG. 3 | FIG. 3 |
| Supplemental belt | Present | Present | Present | Present | Present | Present |
| Material of belt cord | Steel | Steel | Steel | Steel | Steel | Steel |
| Tbt/OD | 84 | 84 | 84 | 84 | 84 | 84 |
| TL/OD | 0.0009 | 0.0015 | 0.0024 | 0.0081 | 0.0024 | 0.0024 |
| TCSU/TL | 1.200 | 1.250 | 1.154 | 0.186 | 0.23 | 0.38 |
| MC (MPa) | 1.30 | 1.30 | 1.30 | 1.30 | 1.30 | 1.30 |
| MC/MIL | 0.87 | 0.87 | 0.87 | 0.87 | 0.87 | 0.87 |
| MB/MC | 2.69 | 2.69 | 2.69 | 2.69 | 2.69 | 2.69 |
| TC × tanδ | 0.50 | 0.50 | 0.50 | 0.50 | 0.50 | 0.50 |
| Hpp/TCB | 67 | 67 | 67 | 67 | 67 | 67 |
| Hb_sh/Hb_ce | 1.00 | 1.00 | 1.00 | 1.00 | 1.00 | 1.00 |
| DA/TW | 0.061 | 0.061 | 0.061 | 0.061 | 0.061 | 0.061 |
| CRw/TRw | 1.50 | 1.50 | 1.50 | 1.50 | 1.50 | 1.50 |
| Tsh/Tce | 0.59 | 0.59 | 0.59 | 0.59 | 0.59 | 0.59 |
| Tsh/Tu | 7.42 | 7.42 | 7.42 | 7.42 | 7.42 | 7.42 |
| Low rolling resistance performance | 106 | 108 | 108 | 106 | 110 | 113 |
| Wear resistance performance | 110 | 110 | 111 | 111 | 111 | 111 |
| Durability performance | 110 | 110 | 110 | 110 | 109 | 110 |

FIG. 13A

| | Example 21 | Example 22 | Example 23 | Example 24 | Example 25 |
|---|---|---|---|---|---|
| Tire structure | FIG. 1 | FIG. 1 | FIG. 1 | FIG. 1 | FIG. 1 |
| OD (mm) | 531 | 531 | 531 | 531 | 531 |
| SW (mm) | 143 | 143 | 143 | 143 | 143 |
| TW (mm) | 123 | 123 | 123 | 123 | 123 |
| RD (mm) | 305 | 305 | 305 | 305 | 305 |
| SW/OD | 0.27 | 0.27 | 0.27 | 0.27 | 0.27 |
| TW/SW | 0.86 | 0.86 | 0.86 | 0.86 | 0.86 |
| Number of carcass plies | 2 | 2 | 2 | 2 | 2 |
| Material of carcass cord | Polyester fiber | Polyester fiber | Polyester fiber | Polyester fiber | Polyester fiber |
| Tcs/OD | 30 | 30 | 30 | 30 | 30 |
| Hcs/SH | 0.59 | 0.59 | 0.59 | 0.59 | 0.59 |
| Hcs'/SH | 0.29 | 0.29 | 0.29 | 0.29 | 0.29 |
| Belt structure | FIG. 3 | FIG. 3 | FIG. 3 | FIG. 3 | FIG. 3 |
| Supplemental belt | Present | Present | Present | Present | Present |
| Material of belt cord | Steel | Steel | Steel | Steel | Steel |
| Tbt/OD | 84 | 84 | 84 | 84 | 84 |
| TL/OD | 0.0024 | 0.0024 | 0.0024 | 0.0024 | 0.0024 |
| TCSU/TL | 0.85 | 0.38 | 0.38 | 0.38 | 0.38 |
| MC (MPa) | 1.30 | 1.70 | 3.00 | 10.2 | 3.00 |
| MC/MIL | 0.87 | 1.13 | 2.00 | 2.37 | 2.00 |
| MB/MC | 2.69 | 2.53 | 2.53 | 0.34 | 1.17 |
| TC × tanδ | 0.50 | 0.50 | 0.50 | 0.50 | 0.50 |
| Hpp/TCB | 67 | 67 | 67 | 67 | 67 |
| Hb_sh/Hb_ce | 1.00 | 1.00 | 1.00 | 1.00 | 1.00 |
| DA/TW | 0.061 | 0.061 | 0.061 | 0.061 | 0.061 |
| CRw/TRw | 1.50 | 1.50 | 1.50 | 1.50 | 1.50 |
| Tsh/Tce | 0.59 | 0.59 | 0.59 | 0.59 | 0.59 |
| Tsh/Tu | 7.42 | 7.42 | 7.42 | 7.42 | 7.42 |
| Low rolling resistance performance | 111 | 111 | 111 | 105 | 114 |
| Wear resistance performance | 111 | 112 | 114 | 116 | 114 |
| Durability performance | 111 | 112 | 114 | 116 | 114 |

FIG. 13B

| | Example 26 | Example 27 | Example 28 | Example 29 | Example 30 |
|---|---|---|---|---|---|
| Tire structure | FIG. 1 | FIG. 1 | FIG. 1 | FIG. 1 | FIG. 1 |
| OD (mm) | 531 | 531 | 531 | 531 | 531 |
| SW (mm) | 143 | 143 | 143 | 143 | 143 |
| TW (mm) | 123 | 123 | 123 | 123 | 123 |
| RD (mm) | 305 | 305 | 305 | 305 | 305 |
| SW/OD | 0.27 | 0.27 | 0.27 | 0.27 | 0.27 |
| TW/SW | 0.86 | 0.86 | 0.86 | 0.86 | 0.86 |
| Number of carcass plies | 2 | 2 | 2 | 2 | 2 |
| Material of carcass cord | Polyester fiber | Polyester fiber | Polyester fiber | Polyester fiber | Polyester fiber |
| Tcs/OD | 30 | 30 | 30 | 30 | 30 |
| Hcs/SH | 0.59 | 0.59 | 0.59 | 0.59 | 0.59 |
| Hcs'/SH | 0.29 | 0.29 | 0.29 | 0.29 | 0.29 |
| Belt structure | FIG. 3 | FIG. 3 | FIG. 3 | FIG. 3 | FIG. 3 |
| Supplemental belt | Present | Present | Present | Present | Present |
| Material of belt cord | Steel | Steel | Steel | Steel | Steel |
| Tbt/OD | 84 | 84 | 84 | 84 | 84 |
| TL/OD | 0.0024 | 0.0024 | 0.0024 | 0.0024 | 0.0024 |
| TCSU/TL | 0.38 | 0.38 | 0.38 | 0.38 | 0.38 |
| MC (MPa) | 3.00 | 3.00 | 3.00 | 3.00 | 3.00 |
| MC/MIL | 2.00 | 2.00 | 2.00 | 2.00 | 2.00 |
| MB/MC | 2.13 | 2.37 | 2.13 | 2.13 | 2.13 |
| TC × tanδ | 0.50 | 0.50 | 0.08 | 0.10 | 0.40 |
| Hpp/TCB | 67 | 67 | 67 | 67 | 67 |
| Hb_sh/Hb_ce | 1.00 | 1.00 | 1.00 | 1.00 | 1.00 |
| DA/TW | 0.061 | 0.061 | 0.061 | 0.061 | 0.061 |
| CRw/TRw | 1.50 | 1.50 | 1.50 | 1.50 | 1.50 |
| Tsh/Tce | 0.59 | 0.59 | 0.59 | 0.59 | 0.59 |
| Tsh/Tu | 7.42 | 7.42 | 7.42 | 7.42 | 7.42 |
| Low rolling resistance performance | 113 | 111 | 113 | 113 | 110 |
| Wear resistance performance | 114 | 114 | 114 | 114 | 114 |
| Durability performance | 116 | 117 | 117 | 118 | 120 |

FIG. 13C

| | Example 31 | Example 32 | Example 33 | Example 34 | Example 35 | Example 36 |
|---|---|---|---|---|---|---|
| Tire structure | FIG. 1 | FIG. 1 | FIG. 1 | FIG. 1 | FIG. 1 | FIG. 1 |
| OD (mm) | 531 | 531 | 531 | 531 | 531 | 531 |
| SW (mm) | 143 | 143 | 143 | 143 | 143 | 143 |
| TW (mm) | 123 | 123 | 123 | 123 | 123 | 123 |
| RD (mm) | 305 | 305 | 305 | 305 | 305 | 305 |
| SW/OD | 0.27 | 0.27 | 0.27 | 0.27 | 0.27 | 0.27 |
| TW/SW | 0.86 | 0.86 | 0.86 | 0.86 | 0.86 | 0.86 |
| Number of carcass plies | 2 | 2 | 2 | 2 | 2 | 2 |
| Material of carcass cord | Polyester fiber | Polyester fiber | Polyester fiber | Polyester fiber | Polyester fiber | Polyester fiber |
| Tcs/OD | 30 | 30 | 30 | 30 | 30 | 30 |
| Hcs/SH | 0.59 | 0.59 | 0.59 | 0.59 | 0.59 | 0.59 |
| Hcs'/SH | 0.29 | 0.29 | 0.29 | 0.29 | 0.29 | 0.29 |
| Belt structure | FIG. 3 | FIG. 3 | FIG. 3 | FIG. 3 | FIG. 3 | FIG. 3 |
| Supplemental belt | Present | Present | Present | Present | Present | Present |
| Material of belt cord | Steel | Steel | Steel | Steel | Steel | Steel |
| Tbt/OD | 84 | 84 | 84 | 84 | 84 | 84 |
| TL/OD | 0.0024 | 0.0024 | 0.0024 | 0.0024 | 0.0024 | 0.0024 |
| TCSU/TL | 0.38 | 0.38 | 0.38 | 0.38 | 0.38 | 0.38 |
| MC (MPa) | 3.00 | 3.00 | 3.00 | 3.00 | 3.00 | 3.00 |
| MC/MIL | 2.00 | 2.00 | 2.00 | 2.00 | 2.00 | 2.00 |
| MB/MC | 2.13 | 2.13 | 2.13 | 2.13 | 2.13 | 2.13 |
| TC × tanδ | 0.10 | 0.10 | 0.10 | 0.10 | 0.10 | 0.10 |
| Hpp/TCB | 100 | 200 | 287 | 200 | 200 | 200 |
| Hb_sh/Hb_ce | 1.00 | 1.00 | 1.00 | 1.10 | 1.40 | 1.80 |
| DA/TW | 0.061 | 0.061 | 0.061 | 0.061 | 0.061 | 0.061 |
| CRw/TRw | 1.50 | 1.50 | 1.50 | 1.50 | 1.50 | 1.50 |
| Tsh/Tce | 0.59 | 0.59 | 0.59 | 0.59 | 0.59 | 0.59 |
| Tsh/Tu | 7.42 | 7.42 | 7.42 | 7.42 | 7.42 | 7.42 |
| Low rolling resistance performance | 113 | 111 | 108 | 111 | 111 | 108 |
| Wear resistance performance | 114 | 114 | 114 | 114 | 114 | 114 |
| Durability performance | 119 | 123 | 125 | 124 | 126 | 127 |

FIG. 14A

| | Example 37 | Example 38 | Example 39 | Example 40 | Example 41 | Example 42 |
|---|---|---|---|---|---|---|
| Tire structure | FIG. 1 | FIG. 1 | FIG. 1 | FIG. 1 | FIG. 1 | FIG. 1 |
| OD (mm) | 531 | 531 | 531 | 531 | 531 | 531 |
| SW (mm) | 143 | 143 | 143 | 143 | 143 | 143 |
| TW (mm) | 123 | 123 | 123 | 123 | 123 | 123 |
| RD (mm) | 305 | 305 | 305 | 305 | 305 | 305 |
| SW/OD | 0.27 | 0.27 | 0.27 | 0.27 | 0.27 | 0.27 |
| TW/SW | 0.86 | 0.86 | 0.86 | 0.86 | 0.86 | 0.86 |
| Number of carcass plies | 2 | 2 | 2 | 2 | 2 | 2 |
| Material of carcass cord | Polyester fiber | Polyester fiber | Polyester fiber | Polyester fiber | Polyester fiber | Polyester fiber |
| Tcs/OD | 30 | 30 | 30 | 30 | 30 | 30 |
| Hcs/SH | 0.59 | 0.59 | 0.59 | 0.59 | 0.59 | 0.59 |
| Hcs'/SH | 0.29 | 0.29 | 0.29 | 0.29 | 0.29 | 0.29 |
| Belt structure | FIG. 3 | FIG. 3 | FIG. 3 | FIG. 3 | FIG. 3 | FIG. 3 |
| Supplemental belt | Present | Present | Present | Present | Present | Present |
| Material of belt cord | Steel | Steel | Steel | Steel | Steel | Steel |
| Tbt/OD | 84 | 84 | 84 | 84 | 84 | 84 |
| TL/OD | 0.0024 | 0.0024 | 0.0024 | 0.0024 | 0.0024 | 0.0024 |
| TCSU/TL | 0.38 | 0.38 | 0.38 | 0.38 | 0.38 | 0.38 |
| MC (MPa) | 3.00 | 3.00 | 3.00 | 3.00 | 3.00 | 3.00 |
| MC/MIL | 2.00 | 2.00 | 2.00 | 2.00 | 2.00 | 2.00 |
| MB/MC | 2.13 | 2.13 | 2.13 | 2.13 | 2.13 | 2.13 |
| TC × tanδ | 0.10 | 0.10 | 0.10 | 0.10 | 0.10 | 0.10 |
| Hpp/TCB | 200 | 200 | 200 | 200 | 200 | 200 |
| Hb_sh/Hb_ce | 1.40 | 1.40 | 1.40 | 1.40 | 1.40 | 1.40 |
| DA/TW | 0.010 | 0.046 | 0.054 | 0.046 | 0.046 | 0.046 |
| CRw/TRw | 1.50 | 1.50 | 1.50 | 0.40 | 0.99 | 1.40 |
| Tsh/Tce | 0.59 | 0.59 | 0.59 | 0.59 | 0.59 | 0.59 |
| Tsh/Tu | 7.42 | 7.42 | 7.42 | 7.42 | 7.42 | 7.42 |
| Low rolling resistance performance | 110 | 111 | 110 | 110 | 112 | 113 |
| Wear resistance performance | 118 | 117 | 117 | 120 | 120 | 118 |
| Durability performance | 125 | 126 | 126 | 125 | 127 | 127 |

FIG. 14B

| | Example 43 | Example 44 | Example 45 | Example 46 | Example 47 | Example 48 |
|---|---|---|---|---|---|---|
| Tire structure | FIG. 1 | FIG. 1 | FIG. 1 | FIG. 1 | FIG. 1 | FIG. 1 |
| OD (mm) | 531 | 531 | 531 | 531 | 531 | 531 |
| SW (mm) | 143 | 143 | 143 | 143 | 143 | 143 |
| TW (mm) | 123 | 123 | 123 | 123 | 123 | 123 |
| RD (mm) | 305 | 305 | 305 | 305 | 305 | 305 |
| SW/OD | 0.27 | 0.27 | 0.27 | 0.27 | 0.27 | 0.27 |
| TW/SW | 0.86 | 0.86 | 0.86 | 0.86 | 0.86 | 0.86 |
| Number of carcass plies | 2 | 2 | 2 | 2 | 2 | 2 |
| Material of carcass cord | Polyester fiber | Polyester fiber | Polyester fiber | Polyester fiber | Polyester fiber | Polyester fiber |
| Tcs/OD | 30 | 30 | 30 | 30 | 30 | 30 |
| Hcs/SH | 0.59 | 0.59 | 0.59 | 0.59 | 0.59 | 0.59 |
| Hcs'/SH | 0.29 | 0.29 | 0.29 | 0.29 | 0.29 | 0.29 |
| Belt structure | FIG. 3 | FIG. 3 | FIG. 3 | FIG. 3 | FIG. 3 | FIG. 3 |
| Supplemental belt | Present | Present | Present | Present | Present | Present |
| Material of belt cord | Steel | Steel | Steel | Steel | Steel | Steel |
| Tbt/OD | 84 | 84 | 84 | 84 | 84 | 84 |
| TL/OD | 0.0024 | 0.0024 | 0.0024 | 0.0024 | 0.0024 | 0.0024 |
| TCSU/TL | 0.38 | 0.38 | 0.38 | 0.38 | 0.38 | 0.38 |
| MC (MPa) | 3.00 | 3.00 | 3.00 | 3.00 | 3.00 | 3.00 |
| MC/MIL | 2.00 | 2.00 | 2.00 | 2.00 | 2.00 | 2.00 |
| MB/MC | 2.13 | 2.13 | 2.13 | 2.13 | 2.13 | 2.13 |
| TC × tanδ | 0.10 | 0.10 | 0.10 | 0.10 | 0.10 | 0.10 |
| Hpp/TCB | 200 | 200 | 200 | 200 | 200 | 200 |
| Hb_sh/Hb_ce | 1.40 | 1.40 | 1.40 | 1.40 | 1.40 | 1.40 |
| DA/TW | 0.046 | 0.046 | 0.046 | 0.046 | 0.046 | 0.046 |
| CRw/TRw | 0.99 | 0.99 | 0.99 | 0.99 | 0.99 | 0.99 |
| Tsh/Tce | 0.63 | 1.00 | 1.59 | 1.00 | 1.00 | 1.00 |
| Tsh/Tu | 7.80 | 7.75 | 7.75 | 1.65 | 6.53 | 6.89 |
| Low rolling resistance performance | 112 | 112 | 114 | 110 | 112 | 113 |
| Wear resistance performance | 123 | 125 | 123 | 125 | 125 | 125 |
| Durability performance | 130 | 129 | 127 | 132 | 131 | 129 |

FIG. 14C

TIRE

TECHNICAL FIELD

The technology relates to a tire and particularly relates to a tire having a small diameter that can provide low rolling resistance performance and wear resistance performance in a compatible manner.

BACKGROUND ART

In recent years, there has been developed a small-diameter tire to be mounted on a vehicle in which a floor is lowered to expand a vehicle interior space. In such a small-diameter tire, since rotational inertia is small and a tire weight is also small, a reduction in transportation cost is expected. On the other hand, the small-diameter tire is required to have a high load capacity. Technology described in International Patent Publication No. WO 2020/122169 is a known tire in the related art associated with such a problem.

SUMMARY

The technology provides a tire having a small diameter that can provide low rolling resistance performance and wear resistance performance in a compatible manner.

A tire according to the technology may include a pair of bead cores, a carcass layer, and a belt layer. The carcass layer may extend between the bead cores. The belt layer may be disposed on an outer side of the carcass layer in a radial direction. A tire outer diameter OD (mm) may be in a range $200 \leq OD \leq 660$. A total tire width SW (mm) may be in a range $100 \leq SW \leq 400$. The carcass layer may be formed by layering two layers of carcass plies formed by covering organic fiber cords with coating rubbers. The organic fiber cords of the two layers of the carcass plies may have cord angles in a range of 80 degrees or more and 100 degrees or less with respect to a tire circumferential direction. A tensile strength Tcs (N/50 mm) per a width of 50 mm of each of the two layers of the carcass plies may be in a range $17 \leq Tcs/OD \leq 120$ with respect to the tire outer diameter OD (mm).

A tire according to the technology may include a pair of bead cores and a carcass layer. The carcass layer may extend between the bead cores. A tire outer diameter OD (mm) may be in a range $200 \leq OD \leq 660$. A total tire width SW (mm) may be in a range $100 \leq SW \leq 400$. The carcass layer may be formed by layering two layers of carcass plies formed by covering organic fiber cords with coating rubbers. The organic fiber cords of the two layers of the carcass plies may have cord angles having mutually different signs in a range of 45 degrees or more and 70 degrees or less with respect to a tire circumferential direction. A tensile strength Tcs (N/50 mm) per a width of 50 mm of each of the two layers of the carcass plies may be in a range $17 \leq Tcs/OD \leq 120$ with respect to the tire outer diameter OD (mm).

In the tire according to the technology, since a load capacity of the carcass layer is appropriately ensured in the small-diameter tire, there is an advantage of providing wear resistance performance and low rolling resistance performance of the tire in a compatible manner. Specifically, the lower limit of the ratio Tcs/OD suppresses tire deformation during use under a high load and ensures the wear resistance performance of the tire. The upper limit of the ratio Tcs/OD suppresses the deterioration of the rolling resistance caused by the increase in the weight of the carcass layer.

BRIEF DESCRIPTION OF DRAWINGS

FIGS. 12A-12C include a table showing results of performance tests of tires according to embodiments of the technology.

FIGS. 13A-13C include a table showing results of performance tests of tires according to embodiments of the technology.

FIGS. 14A-14C include a table showing results of performance tests of tires according to embodiments of the technology.

DETAILED DESCRIPTION

Embodiments of the technology will be described in detail below with reference to the drawings. Note that the technology is not limited to the embodiments. Additionally, constituents of the embodiments include constituents that are substitutable and are obviously substitutes while maintaining consistency with the embodiments of the technology. Additionally, a plurality of modified examples described in the embodiments can be combined in a discretionary manner within the scope apparent to one skilled in the art.

Tire

Figure 1:
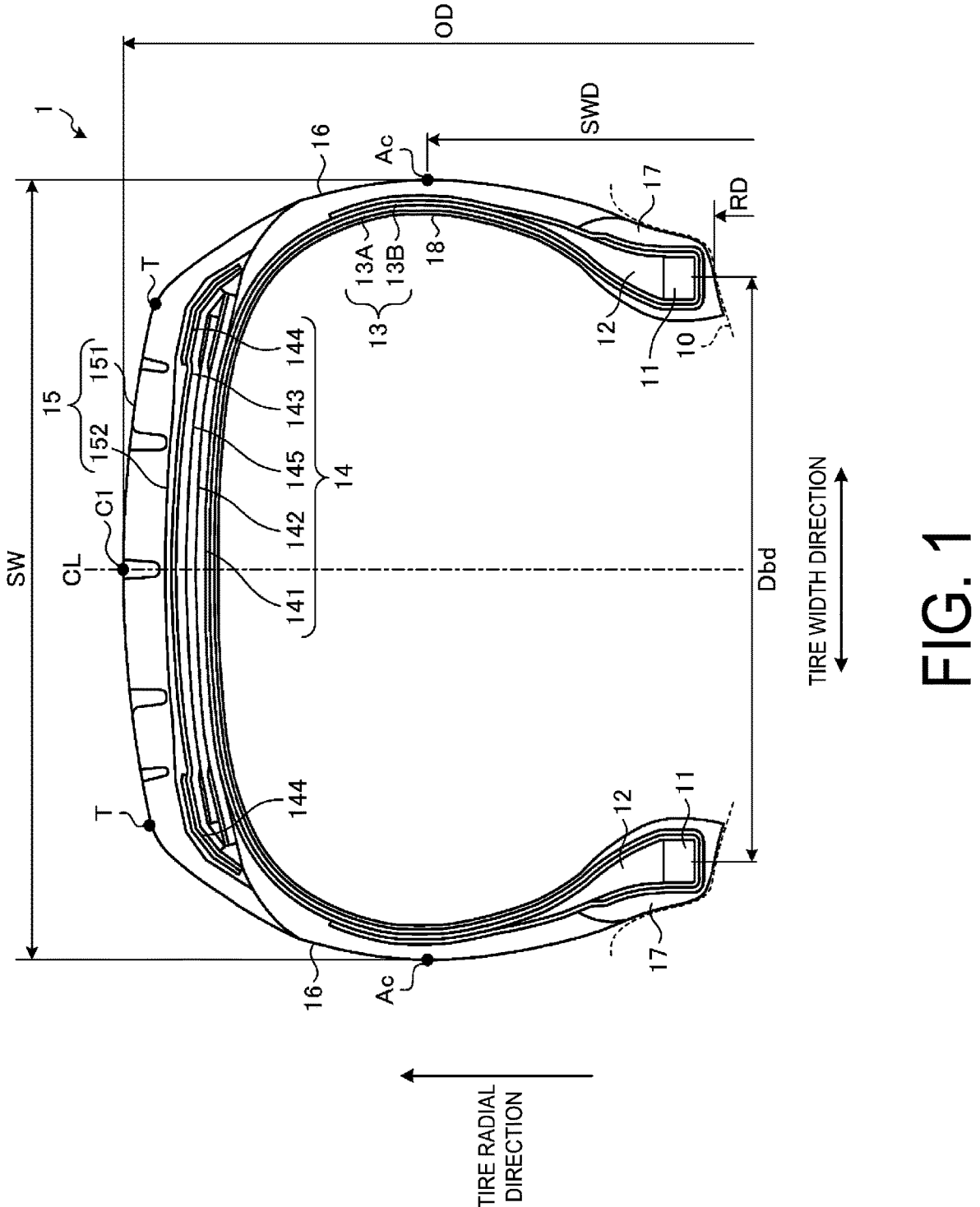
FIG. 1 is a cross-sectional view in a tire meridian direction illustrating a tire according to an embodiment of the technology.

FIG. 1 is a cross-sectional view in a tire meridian direction illustrating a tire 1 according to an embodiment of the technology. The same drawing illustrates a cross-sectional view of a half region of the tire 1 mounted on a rim 10 in a tire radial direction. In this embodiment, a pneumatic radial tire for passenger vehicles will be described as an example of a tire.

In the same drawing, a cross-section in the tire meridian direction is defined as a cross-section of the tire taken along a plane that includes a tire rotation axis (not illustrated). Additionally, a tire equatorial plane CL is defined as a plane that passes through a midpoint of a tire cross-sectional width specified by the Japan Automobile Tyre Manufacturers Association Inc. (JATMA) and that is perpendicular to the tire rotation axis. Additionally, a tire width direction is defined as a direction parallel to the tire rotation axis, and the tire radial direction is defined as a direction perpendicular to the tire rotation axis. Additionally, a point T is a tire ground contact edge, and a point Ac is a tire maximum width position.

The tire 1 includes an annular structure with the tire rotation axis serving as the center, and includes a pair of bead cores 11, 11, a pair of bead fillers 12, 12, a carcass layer 13, a belt layer 14, a tread rubber 15, a pair of sidewall rubbers 16, 16, a pair of rim cushion rubbers 17, 17, and an innerliner 18 (see FIG. 1).

The pair of bead cores 11, 11 each include one or more of bead wires made of steel and made by being wound annularly multiple times, are embedded in bead portions, and constitute cores of the left and right bead portions. The pair of bead fillers 12, 12 are respectively disposed on an outer circumference of the pair of bead cores 11, 11 in the tire radial direction and reinforce the bead portions.

The carcass layer 13 has a multilayer structure formed by layering two carcass plies 13A, 13B, extends in a toroidal shape between the left and right bead cores 11, 11, and constitutes the backbone of the tire. Both end portions of the carcass layer 13 are turned back toward outer sides in the tire width direction and fixed to wrap the bead cores 11 and the bead fillers 12. Moreover, the carcass plies 13A, 13B of the carcass layer 13 are made by covering a plurality of carcass cords made of an organic fiber material (for example, aramid, nylon, polyester, rayon, or the like) with a coating rubber and performing a rolling process on the carcass cords, and have cord angles (defined as inclination angles in a longitudinal direction of the carcass cords with respect to a tire circumferential direction) of 80 degrees or more and 100 degrees or less.

The belt layer 14 is made of a plurality of belt plies 141 to 144 being layered and is disposed around an outer circumference of the carcass layer 13. In the configuration of FIG. 1, the belt plies 141 to 144 are constituted by a pair of cross belts 141, 142, a belt cover 143, a pair of belt edge covers 144, 144, and a supplemental belt 145.

The pair of cross belts 141, 142 are made by covering a plurality of belt cords made of steel or an organic fiber material with a coating rubber and performing a rolling process on the belt cords and have cord angles θ41, θ42 (defined as inclination angles in a longitudinal direction of the belt cords with respect to the tire circumferential direction, see FIG. 3 described later) of 15 degrees or more and 55 degrees or less as the absolute value. Additionally, the pair of cross belts 141, 142 have a cord angle having mutually opposite signs and are layered by making the belt cords mutually intersect in the longitudinal direction of the belt cords (a so-called crossply structure). Furthermore, the pair of cross belts 141, 142 are disposed in a layered manner on an outer side in the tire radial direction of the carcass layer 13.

The belt cover 143 and the pair of belt edge covers 144, 144 are made by covering belt cover cords made of steel or an organic fiber material with a coating rubber and have cord angles θ43, θ44 (see FIG. 3 described later) of 0 degrees or more and 10 degrees or less as the absolute value. Additionally, for example, a strip material is formed of one or a plurality of belt cover cords covered with coating rubber, and the belt cover 143 and the belt edge covers 144 are made by winding this strip material multiple times and in a spiral-like manner in the tire circumferential direction around outer circumferential surfaces of the cross belts 141, 142. Additionally, the belt cover 143 is disposed completely covering the cross belts 141, 142, and the pair of belt edge covers 144, 144 are disposed covering the left and right edge portions of the cross belts 141, 142 from the outer side in the tire radial direction.

The supplemental belt 145 is, for example, (1) a third cross belt constituted by covering a plurality of belt cords made of steel or an organic fiber material with a coating rubber and performing a rolling process on the belt cords and the belt cords having cord angles θ45 (see FIG. 3 described later) of 15 degrees or more and 80 degrees or less as the absolute value or (2) a so-called large-angle belt constituted by covering a plurality of belt cords made of steel or an organic fiber material with a coating rubber and performing a rolling process on the belt cords and the belt cords having the cord angles θ45 (see FIG. 9 described later) of 45 degrees or more and 70 degrees or less and preferably 54 degrees or more and 68 degrees or less as the absolute value. The supplemental belt 145 is disposed (a) between the cross belt 141 on a radially inner side and the carcass layer 13 (see FIGS. 1 and 3 described later), (b) between the pair of cross belts 141, 142 (not illustrated), or (c) the outer side of the pair of cross belts 141, 142 in the radial direction (see FIG. 9 described later). In these configurations, an outer diameter growth of the tire is suppressed by the supplemental belt 145, and a load capacity of the tire is improved.

The tread rubber 15 is disposed on an outer periphery in the tire radial direction of the carcass layer 13 and the belt layer 14 and constitutes a tread portion of the tire 1. Additionally, the tread rubber 15 includes a cap tread 151 and an undertread 152.

The cap tread 151 is made of a rubber material that is excellent in ground contact characteristics and weather resistance, and the cap tread 151 is exposed in a tread surface all across a tire ground contact surface, and constitutes an outer surface of the tread portion. The cap tread 151 has a rubber hardness Hs_cap of 50 or more and 80 or less, a modulus M_cap (MPa) at 100% elongation of 1.0 or more and 4.0 or less, and a loss tangent tan δ_cap of 0.03 or more and 0.36 or less and preferably the rubber hardness Hs_cap of 58 or more and 76 or less, the modulus M_cap (MPa) at 100% elongation of 1.5 or more and 3.2 or less, and the loss tangent tan δ_cap of 0.06 or more and 0.29 or less.

The rubber hardness Hs is measured in accordance with JIS (Japanese Industrial Standard) K6253 at a temperature condition of 20° C.

The modulus (breaking strength) is measured by a tensile test at a temperature of 20° C. with a dumbbell-shaped test piece in accordance with JIS K6251 (using a number 3 dumbbell).

The loss tangent tan δ is measured by using a viscoelasticity spectrometer available from Toyo Seiki Seisaku-sho Ltd. at a temperature of 60° C., a shear strain of 10%, an amplitude of ±0.5%, and a frequency of 20 Hz.

The undertread 152 is made of a rubber material excellent in heat resistance, is disposed by being sandwiched between the cap tread 151 and the belt layer 14, and constitutes a base portion of the tread rubber 15. The undertread 152 has a rubber hardness Hs_ut of 47 or more and 80 or less, a modulus M_ut (MPa) at 100% elongation of 1.4 or more and 5.5 or less, and a loss tangent tan δ_ut of 0.02 or more and 0.23 or less and preferably the rubber hardness Hs_ut of 50 or more and 65 or less, the modulus M_ut (MPa) at 100% elongation of 1.7 or more and 3.5 or less, and the loss tangent tan δ_ut of 0.03 or more and 0.10 or less.

A difference in the rubber hardness Hs_cap−Hs_ut is in the range of 3 or more and 20 or less and preferably in the range of 5 or more and 15 or less. A difference in modulus M_cap−M_ut (MPa) is in the range of 0 or more and 1.4 or less and preferably in the range of 0.1 or more and 1.0 or less. A difference in loss tangent tan $\delta$_cap–tan $\delta$_ut is in the range of 0 or more and 0.22 or less and preferably in the range of 0.02 or more and 0.16 or less.

The pair of sidewall rubbers 16, 16 are each disposed on an outer side of the carcass layer 13 in the tire width direction and constitute left and right sidewall portions. In the configuration of FIG. 1, the end portion of the sidewall rubber 16 on the outer side in the tire radial direction is disposed in the lower layer of the tread rubber 15 and is sandwiched between the end portion of the belt layer 14 and the carcass layer 13. However, no such limitation is intended, and the end portion of the sidewall rubber 16 on the outer side in the tire radial direction may be disposed in an outer layer of the tread rubber 15 and exposed in a buttress portion of the tire (not illustrated). In this case, a belt cushion (not illustrated) is sandwiched between the end portion of the belt layer 14 and the carcass layer 13.

The sidewall rubber 16 has a rubber hardness Hs_sw of 48 or more and 65 or less, a modulus M_sw (MPa) at 100% elongation of 1.0 or more and 2.4 or less, and a loss tangent tan $\delta$_sw of 0.02 or more and 0.22 or less and preferably the rubber hardness Hs_sw of 50 or more and 59 or less, the modulus M_sw (MPa) at 100% elongation of 1.2 or more and 2.2 or less, and the loss tangent tan $\delta$_sw of 0.04 or more and 0.20 or less.

The pair of rim cushion rubbers 17, 17 extend from an inner side in the tire radial direction of the left and right bead cores 11, 11 and turned back portions of the carcass layer 13 toward the outer side in the tire width direction, and constitute rim fitting surfaces of the bead portions. In the configuration of FIG. 1, an end portion on the outer side in the tire radial direction of the rim cushion rubber 17 is inserted to a lower layer of the sidewall rubber 16 and is disposed by being sandwiched between the sidewall rubber 16 and the carcass layer 13.

The innerliner 18 is an air penetration preventing layer disposed on the tire inner surface and covering the carcass layer 13, suppresses oxidation caused by exposure of the carcass layer 13, and prevents leaking of the air in the tire. Additionally, the innerliner 18 may be made of, for example, a rubber composition containing butyl rubber as a main component, or may be made of a thermoplastic resin or a thermoplastic elastomer composition containing an elastomer component blended with a thermoplastic resin or the like.

In FIG. 1, a tire outer diameter OD (mm) is in the range $200{\leq}OD{\leq}660$ and preferably in the range 250 mm${\leq}OD{\leq}580$ mm. By applying such a tire having the small diameter as a target, an effect of improving load performances described later is significantly obtained. A total tire width SW (mm) is in the range $100{\leq}SW{\leq}400$ and preferably in the range 105 mm${\leq}SW{\leq}340$ mm. In the tire 1 having the small diameter, for example, a floor of a small vehicle can be lowered to expand a vehicle interior space. Further, since rotational inertia is small and a tire weight is also small, fuel economy is improved and transportation cost is reduced. In particular, when the tire is mounted on an in-wheel motor of a vehicle, a load on a motor is effectively reduced.

The tire outer diameter OD is measured when the tire is mounted on a specified rim, inflated to a specified internal pressure, and in an unloaded state.

The total tire width SW is measured as a linear distance (including all portions such as letters and patterns on the tire side surface) between the sidewalls when the tire is mounted on a specified rim, inflated to a specified internal pressure, and in an unloaded state.

"Specified rim" refers to an "applicable rim" defined by the Japan Automobile Tire Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, the specified internal pressure refers to a "maximum air pressure" specified by JATMA, the maximum value in "TIRE LOAD LIMITS AT VARIOUS COLD INFLATION PRESSURES" specified by TRA, or "INFLATION PRESSURES" specified by ETRTO. Additionally, the specified load refers to a "maximum load capacity" specified by JATMA, the maximum value in "TIRE LOAD LIMITS AT VARIOUS COLD INFLATION PRESSURES" specified by TRA, or "LOAD CAPACITY" specified by ETRTO. However, in the case of JATMA, for a tire for a passenger vehicle, the specified internal pressure is an air pressure of 180 kPa, and the specified load is 88% of the maximum load capacity.

The total tire width SW (mm) is in the range $0.23{\leq}SW/OD{\leq}0.84$ and preferably in the range $0.25{\leq}SW/OD{\leq}0.81$ with respect to the tire outer diameter OD (mm).

The tire outer diameter OD and the total tire width SW preferably satisfy the following mathematical formula (1). Here, A1min=−0.0017, A2min=0.9, A3min=130, A1max=−0.0019, A2max=1.4, and A3max=400 and preferably A1min=−0.0018, A2min=0.9, A3min=160, A1max=−0.0024, A2max=1.6, and A3max=362.

$$A1\min * SW \wedge 2 + A2\min * SW + A3\min \leq OD \leq A1\max * SW \wedge \tag{1}$$

$$2 + A2\max * SW + A3\max$$

In the tire 1, the use of the rim 10 having a rim diameter of 5 inches or more and 16 inches or less (in other words, 125 mm or more and 407 mm or less) is assumed. A rim diameter RD (mm) is in the range $0.50{\leq}RD/OD{\leq}0.74$ and preferably in the range $0.52{\leq}RD/OD{\leq}0.71$ with respect to the tire outer diameter OD (mm). The lower limit can ensure the rim diameter RD and in particular, ensure an installation space for the in-wheel motor. The upper limit ensures an internal volume V of the tire described later and ensures the load capacity of the tire.

Note that the tire inner diameter is equal to the rim diameter RD of the rim 10.

The use of the tire 1 at an internal pressure higher than a specified internal pressure, specifically, an internal pressure of 350 kPa or more and 1200 kPa or less and preferably 500 kPa or more and 1000 kPa or less is assumed. The lower limit effectively reduces the rolling resistance of the tire, and the upper limit ensures safety of internal pressure inflation work.

The tire 1 is assumed to be mounted on a vehicle traveling at a low speed, such as a small shuttle bus. The maximum speed of the vehicle is 100 km/h or less, preferably 80 km/h or less, and more preferably 60 km/h or less. The tires 1 are assumed to be mounted on a vehicle having 6 to 12 wheels. As a result, the load capacity of the tire is appropriately exhibited.

An aspect ratio of the tire, in other words, a ratio between a tire cross-sectional height SH (mm) (see FIG. 2 described later) and a tire cross-sectional width (mm) (dimension symbols omitted in the drawings: same as the total tire width SW in FIG. 1) is in the range from 0.16 or more and 0.85 or less and preferably in the range from 0.19 or more and 0.82 or less.

The tire cross-sectional height SH is a distance equal to half of a difference between a tire outer diameter and a rim diameter, and is measured when the tire is mounted on a specified rim, inflated to a specified internal pressure, and in an unloaded state.

The tire cross-sectional width is measured as a linear distance between sidewalls (excluding patterns, letters, and the like on the tire side surface) when the tire is mounted on a specified rim, inflated to a specified internal pressure, and in an unloaded state.

In addition, a tire ground contact width TW is in the range $0.65 \leq TW/SW \leq 0.95$ and preferably in the range $0.80 \leq TW/SW \leq 0.92$ with respect to the total tire width SW.

The tire ground contact width TW is measured as a maximum linear distance in a tire axial direction in a contact surface between the tire and a flat plate when the tire is mounted on a specified rim, inflated to a specified internal pressure, placed perpendicular to the flat plate in a static state, and subjected to a load corresponding to a specified load.

The tire internal volume V (m3) is in the range $4.0 \leq (V/OD) \times 10^6 \leq 60$ and preferably in the range $6.0 \leq (V/OD) \times 10^6 \leq 50$ with respect to the tire outer diameter OD (mm). This sets the tire internal volume V appropriate. Specifically, the lower limit ensures the tire internal volume and ensures the load capacity of the tire. In particular, since the small-diameter tire is assumed to be used under a high internal pressure and a high load, the tire internal volume V is preferably sufficiently ensured. The upper limit suppresses the increase in size of the tire caused by the excessive tire internal volume V.

The tire internal volume V (m^3) is in the range $0.5 \leq V \times RD \leq 17$ and preferably in the range $1.0 \leq V \times RD \leq 15$ with respect to the rim diameter RD (mm).

Bead Core

In FIG. 1, as described above, the pair of bead cores 11, 11 are formed by winding up one or a plurality of bead wires (not illustrated) made of steel in an annular shape and multiple times. The pair of respective bead fillers 12, 12 are disposed on an outer circumference of the pair of bead cores 11, 11 in the tire radial direction.

A tensile strength Tbd (N) of one bead core 11 is in the range $45 \leq Tbd/OD \leq 120$, preferably in the range $50 \leq Tbd/OD \leq 110$, and more preferably in the range $60 \leq Tbd/OD \leq 105$ with respect to the tire outer diameter OD (mm). The tensile strength Tbd (N) of the bead core is in the range $90 \leq Tbd/SW \leq 400$ and preferably in the range $110 \leq Tbd/SW \leq 350$ with respect to the total tire width SW (mm). As a result, the load capacity of the bead core 11 is appropriately ensured. Specifically, the lower limit suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit suppresses the deterioration of the rolling resistance caused by the increase in the weight of the bead core.

The tensile strength Tbd (N) of the bead core 11 is calculated as a product of the tensile strength (N/piece) per bead wire and the total number of bead wires (piece) in the radial cross-sectional view. The tensile strength of the bead wire is measured by a tensile test at a temperature of 20° C. in accordance with JIS G 3510.

The tensile strength Tbd (N) of the bead core 11 preferably satisfies the following mathematical formula (2) with respect to the tire outer diameter OD (mm), a distance SWD (mm), and the rim diameter RD (mm). Here, B1min=0.26, B2min=10.0, B1max=2.5, and B2max=99.0, preferably B1min=0.35, B2min=14.0, B1max=2.5, and B2max=99.0, more preferably B1min=0.44, B2min=17.6, B1max=2.5, and B2max=99.0, and even more preferably B1min=0.49, B2min=17.9, B1max=2.5, and B2max=99.0. Further, B1min=0.0016×P and B2min=0.07×P are preferable with the use of a specified internal pressure P (kPa) of the tire.

$$B1\min * \{(OD/2) \wedge 2 - (SWD/2) \wedge 2\} + B2\min * RD \leq \qquad (2)$$
$$Tbd \leq B1\max * \{(OD/2) \wedge 2 - (SWD/2) \wedge 2\} + B2\max * RD$$

The distance SWD is a distance twice a radial distance from the tire rotation axis (not illustrated) to a tire maximum width position Ac, in other words, a diameter of the tire maximum width position Ac and is measured when the tire is mounted on a specified rim, inflated to a specified internal pressure, and in an unloaded state.

The tire maximum width position Ac is defined as the maximum width position of the tire cross-sectional width defined by JATMA.

In a radial cross-sectional view of one bead core 11, a total cross-sectional area σbd (mm2) of the bead wire made of the steel described above is in the range $0.025 \leq \sigma bd/OD \leq 0.075$ and preferably in the range $0.030 \leq \sigma bd/OD \leq 0.065$ with respect to the tire outer diameter OD (mm). The total cross-sectional area σbd (mm2) of the bead wire is in the range $11 \leq \sigma bd \leq 36$ and preferably in the range $13 \leq \sigma bd \leq 33$. As a result, the above-described tensile strength Tbd (N) of the bead core 11 is achieved.

The total cross-sectional area σbd (mm2) of the bead wire is calculated as the sum of the cross-sectional areas of the bead wires in the radial cross-sectional view of one bead core 11.

For example, in the configuration of FIG. 1, the bead core 11 has a quadrangular shape formed by arraying the bead wires (not illustrated) having a circular cross-section in a lattice shape. However, the configuration is not limited thereto, and the bead core 11 may have a hexagonal shape formed by arraying the bead wires having a circular cross-section in a closest-packed structure (not illustrated). In addition, any arrangement structure of bead wires can be employed within the scope of obviousness by one skilled in the art.

The total cross-sectional area σbd (mm2) of the bead wire preferably satisfies the following mathematical formula (3) with respect to the tire outer diameter OD (mm), the distance SWD (mm), and the rim diameter RD (mm). Here, Cmin=30 and Cmax=8 and preferably Cmin=25 and Cmax=10.

$$(OD * RD)/(C\min * SWD) \leq \sigma bd \leq (OD * RD)/(C\max * SWD) \qquad (3)$$

The total cross-sectional area σbd (mm2) of the bead wire is in the range $0.50 \leq \sigma bd/Nbd \leq 1.40$ and preferably in the range $0.60 \leq \sigma bd/Nbd \leq 1.20$ with respect to the total cross-sectional area (in other words, the total number of windings) Nbd (piece) of the bead wires of one bead core 11 in the radial cross-sectional view. In other words, a cross-sectional area σbd' (mm2) of a single bead wire is in the range 0.50 mm2/piece or more and 1.40 mm2/piece or less and preferably in the range 0.60 mm2/piece or more and 1.20 mm2/piece or less.

A maximum width Wbd (mm) (see FIG. 2 described later) of one bead core 11 in the radial cross-sectional view is in the range $0.16 \leq Wbd/\sigma bd \leq 0.50$ and preferably in the range $0.20 \leq Wbd/\sigma bd \leq 0.40$ with respect to the total cross-sectional area $\sigma bd$ (mm2) of the bead wire.

In FIG. 1, a distance Dbd (mm) between the centers of gravity of the pair of bead cores 11, 11 is in the range $0.63 \leq Dbd/SW \leq 0.97$ and preferably in the range $0.65 \leq Dbd/SW \leq 0.95$ with respect to the total tire width SW (mm). The lower limit reduces an amount of deflection of the tire and reduces the rolling resistance of the tire. The upper limit reduces stress acting on the tire side portion and suppresses a tire failure.

Carcass Layer

Figure 2:
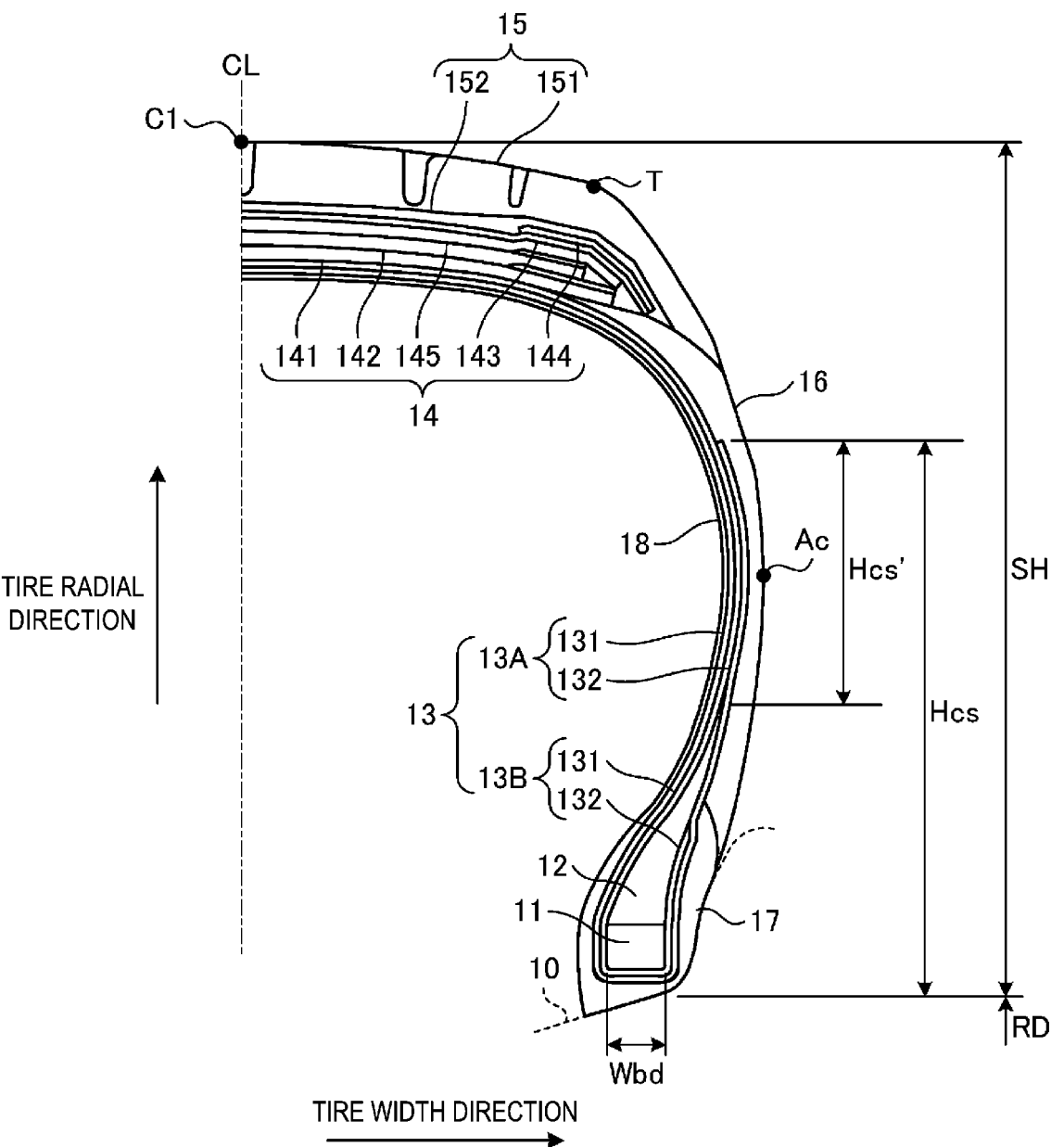
FIG. 2 is an enlarged view illustrating the tire illustrated in FIG. 1.

FIG. 2 is an enlarged view illustrating the tire 1 illustrated in FIG. 1. The same drawing illustrates the half region demarcated by the tire equatorial plane CL.

In the configuration of FIG. 1, as described above, the carcass layer 13 is formed of the two layered carcass plies 13A, 13B and is disposed to extend in the toroidal shape between the left and right bead cores 11, 11. Both end portions of the carcass layer 13 are turned back toward outer sides in the tire width direction and fixed to wrap the bead cores 11 and the bead fillers 12.

The tensile strength Tcs (N/50 mm) per a width of 50 mm of each of the carcass plies 13A, 13B constituting the carcass layer 13 is in the range $17 \leq Tcs/OD \leq 120$ and preferably in the range $20 \leq Tcs/OD \leq 60$ with respect to the tire outer diameter OD (mm). The tensile strength Tcs (N/50 mm) of the carcass layer 13 is in the range $30 \leq Tcs/SW \leq 260$ and preferably in the range $35 \leq Tcs/SW \leq 180$ with respect to the total tire width SW (mm). As a result, the load capacity of the carcass layer 13 is appropriately ensured. Specifically, the lower limit suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit suppresses the deterioration of the rolling resistance caused by the increase in the weight of the carcass layer.

The tensile strength Tcs (N/50 mm) of the carcass ply is calculated as follows. In other words, the carcass plies 13A, 13B extending between the left and right bead cores 11, 11 and extending over the entire region of the tire inner circumference are defined as effective carcass plies. The product of the tensile strength (N/piece) per carcass cord constituting the effective carcass plies 13A, 13B and the number of insertions (piece/50 mm) of the carcass cords per the width of 50 mm on the tire equatorial plane CL over the entire circumference of the tire is calculated as the tensile strength Tcs (N/50 mm) of the carcass plies. The tensile strength of the carcass cord is measured by a tensile test at a temperature of 20° C. in accordance with JIS L 1017. For example, in a configuration in which one carcass cord is formed by intertwining, for example, a plurality of wire strands, the tensile strength of the intertwined one carcass cord is measured, and the tensile strength $T_{cs}$ of the carcass layer 13 is calculated. As illustrated in FIG. 1, in a configuration in which the carcass layer 13 has the multilayer structure formed by layering a plurality of the effective carcass plies 13A, 13B, the above-described tensile strength Tcs is defined for each of the plurality of effective carcass plies 13A, 13B.

For example, in the configuration of FIG. 1, the carcass layer 13 has the multilayer structure formed by the two layers of the carcass plies 13A, 13B, and the carcass plies 13A, 13B constituted by the carcass cords made of an organic fiber material (for example, aramid, nylon, polyester, rayon, or the like) covered with a coating rubber (not illustrated). In this case, the carcass cord made of the organic fiber material has the cord diameter φcs (mm) in the range $0.6 \leq \varphi cs \leq 0.9$ and the number of insertions Ecs (piece/50 mm) in the range $40 \leq Ecs \leq 70$, whereby the above-described tensile strength Tcs (N/50 mm) of the carcass layer 13 is achieved. Besides, for example, the carcass cord made by intertwining a plurality of types of organic fiber materials, such as nylon and aramid, can be employed within the scope of obviousness by one skilled in the art.

A total tensile strength TTcs (N/50 mm) of the carcass layer 13 is in the range $300 \leq TTcs/OD \leq 1900$ and preferably in the range $400 \leq TTcs/OD \leq 1000$ with respect to the tire outer diameter OD (mm). As a result, the load capacity of the entire carcass layer 13 is ensured.

The total tensile strength TTcs (N/50 mm) of the carcass layer 13 is calculated as the sum of the tensile strengths Tcs (N/50 mm) of the effective carcass plies described above. Therefore, the total tensile strength TTcs (N/50 mm) of the carcass layer 13 increases with an increase in the tensile strength Tcs (N/50 mm) of each carcass ply, the number of layered carcass plies, a circumferential length of the carcass ply, and the like.

The total tensile strength TTcs (N/50 mm) of the carcass layer 13 preferably satisfies the following mathematical formula (4) with respect to the tire outer diameter OD (mm) and the distance SWD (mm). Here, Dmin=2.2 and Dmax=40, preferably Dmin=4.3 and Dmax=40, more preferably Dmin=6.5 and Dmax=40, and even more preferably Dmin=8.7 and Dmax=40. Further, Dmin=0.02×P is preferable with the use of a specified internal pressure P (kPa) of the tire.

$$Dmin * \{(OD/2) \wedge 2 - (SWD/2) \wedge 2\} \leq \qquad (4)$$
$$TTcs \leq Dmax * \{(OD/2) \wedge 2 - (SWD/2) \wedge 2\}$$

In the configuration of FIG. 1, as illustrated in FIG. 2, the carcass layer 13 includes a body portion 131 extending along the tire inner surface and a turned-up portion 132 turned up to the outer side in the tire width direction so as to wrap around the bead cores 11 and extending in the tire radial direction. In FIG. 2, a radial height Hcs (mm) from a measurement point of the rim diameter RD to an end portion of the turned-up portion 132 of the carcass layer 13 is in the range $0.49 \leq Hcs/SH \leq 0.80$ and preferably in the range $0.55 \leq Hcs/SH \leq 0.75$ with respect to the tire cross-sectional height SH (mm). Thus, the radial height Hcs of the turned-up portion 132 of the carcass layer 13 is made appropriate. Specifically, the lower limit ensures the load capacity of the tire side portion, and the upper limit suppresses the deterioration of the rolling resistance caused by the increase in the weight of the carcass layer.

The radial height Hcs (mm) of the turned-up portion 132 of the carcass layer 13 is measured when the tire is mounted on a specified rim, inflated to a specified internal pressure, and in an unloaded state. In addition, as illustrated in FIG.

2, in the configuration in which the carcass layer 13 includes the two layers of the carcass plies 13A, 13B, the larger radial height Hcs (mm) is employed.

For example, in the configuration of FIG. 2, both of the two layers of the carcass plies 13A, 13B are turned up in the outer side in the tire width direction so as to wrap around the bead core 11. The turned-up portion 132 of the carcass ply 13A on the radially inner side covers an end portion (reference sign omitted in drawings) on the outer side of the turned-up portion 132 in the radial direction of the carcass ply 13B on the radially outer side from the outer side in the tire width direction. The end portion (reference sign omitted in drawings) on the outer side of the turned-up portion 132 in the radial direction of the carcass ply 13A on the radially inner side is in a region between the tire maximum width position Ac and an end portion (a point Au described later) of the belt layer 14, and more specifically, in a region from the tire maximum width position Ac to a radial position Au' at 70% of a distance Hu described later. At this time, a contact height Hcs' (mm) between the body portion 131 and the turned-up portion 132 of the carcass layer 13 is in the range $0.07 \leq Hcs'/SH$ and preferably in the range $0.15 \leq Hcs'/SH$ with respect to the tire cross-sectional height SH (mm). Accordingly, the load capacity of the tire side portion is effectively enhanced. The upper limit of the ratio Hcs'/SH is not particularly limited, but is restricted by the contact height Hcs' having the relationship $Hcs' \leq Hcs$ with respect to the radial height Hcs of the turned-up portion 132 of the carcass layer 13.

The contact height Hcs' of the carcass layer 13 is an extension length in the tire radial direction of a region in which the body portion 131 and the turned-up portion 132 are in contact with one another and is measured when the tire is mounted on a specified rim, inflated to a specified internal pressure, and in an unloaded state.

The configuration is not limited to the configuration, and by the carcass layer 13 having a so-called low turn-up structure, the end portion of the turned-up portion 132 of the carcass layer 13 may be disposed in a region between the tire maximum width position Ac and the bead core (not illustrated).

Belt Layer

Figure 3:
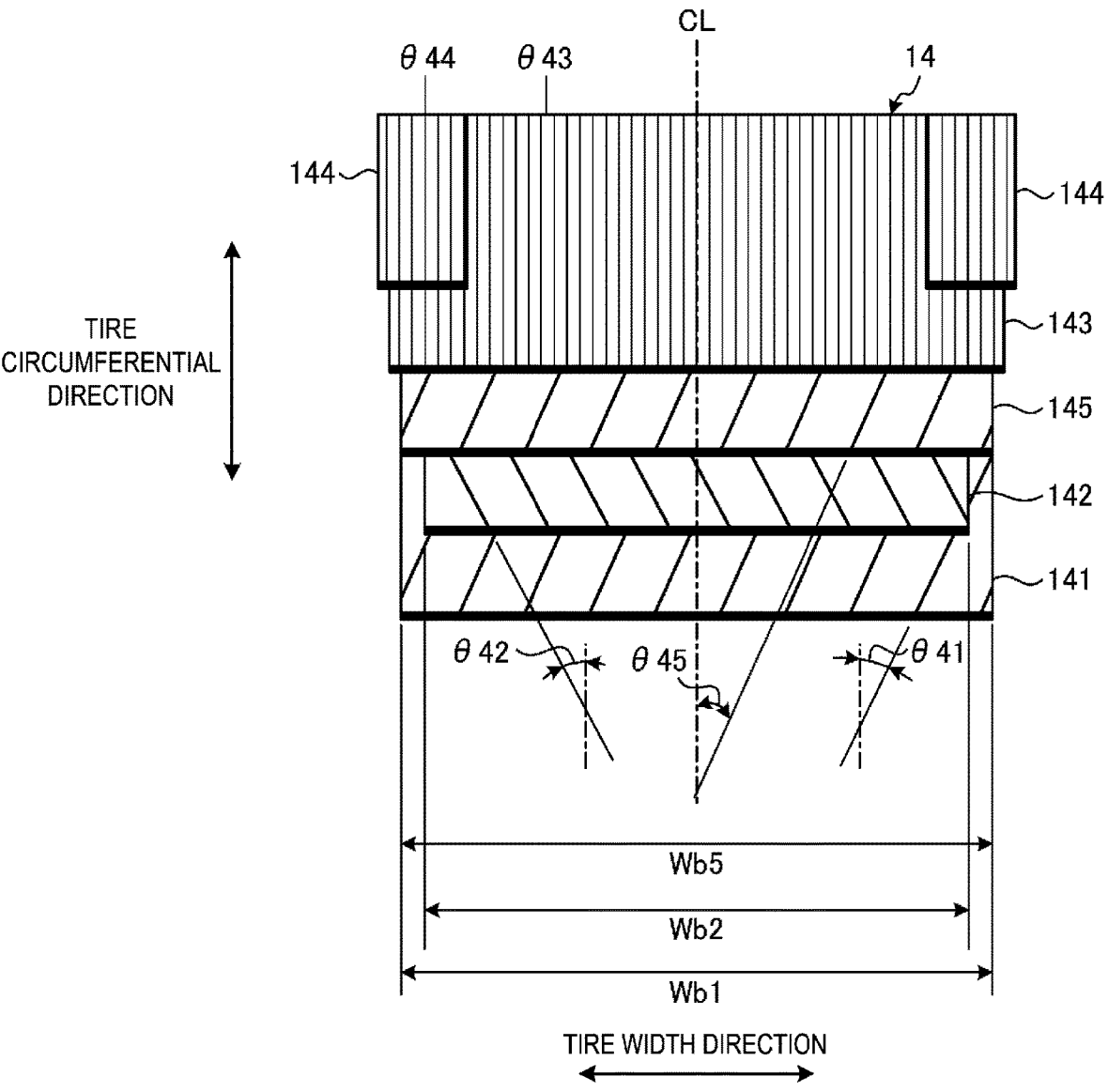
FIG. 3 is an explanatory diagram illustrating a multilayer structure of a belt layer of the tire illustrated in FIG. 1.

FIG. 3 is an explanatory diagram illustrating the multi-layer structure of the belt layer of the tire 1 illustrated in FIG. 1. In the same drawing, the thin lines given to the respective belt plies 141 to 145 schematically illustrate the arrangement configurations of the belt cords.

In the configuration of FIG. 1, as described above, the belt layer 14 is formed by layering the plurality of belt plies 141 to 145. As illustrated in FIG. 3, the belt plies 141 to 145 are constituted by the pair of cross belts 141, 142, the belt cover 143, the pair of belt edge covers 144, 144, and the supplemental belt 145.

At this time, a tensile strength Tbt (N/50 mm) per the width of 50 mm of each of the pair of cross belts 141, 142 and the supplemental belt 145 is in the range $25 \leq Tbt/OD \leq 250$ and preferably in the range $30 \leq Tbt/OD \leq 180$ with respect to the tire outer diameter OD (mm). The tensile strength Tbt (N/50 mm) of the cross belts 141, 142 and the supplemental belt 145 is in the range $45 \leq Tbt/SW \leq 500$ and preferably in the range $50 \leq Tbt/SW \leq 300$ with respect to the total tire width SW (mm). As a result, the respective load capacities of the pair of cross belts 141, 142 and the supplemental belt 145 are appropriately ensured. Specifically, the lower limit suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit suppresses the deterioration of the rolling resistance caused by the increase in the weight of the belt ply.

The tensile strength Tbt (N/50 mm) of the belt ply is calculated as follows. In other words, a belt ply extending over the entire region of 80% of the tire ground contact width TW centered on the tire equatorial plane CL (in other words, the central portion of the tire ground contact region) is defined as an effective belt ply. The product of the tensile strength (N/piece) per belt cord constituting the effective belt ply and the number of insertions (piece) of the belt cords per the width of 50 mm in the region of 80% of the tire ground contact width TW described above is calculated as the tensile strength Tbt (N/50 mm) of the belt ply. The tensile strength of the belt cord is measured by a tensile test at a temperature of 20° C. in accordance with JIS L 1017. For example, in a configuration in which one belt cord is formed by intertwining, for example, a plurality of wire strands, the tensile strength of the intertwined one belt cord is measured, and the tensile strength Tbt of the belt cord is calculated. In a configuration in which the belt layer 14 is formed by layering a plurality of the effective carcass belt plies (see FIG. 1), the above-described tensile strength Tbt is defined for each of the plurality of effective carcass belt plies. For example, in the configuration of FIG. 1, the pair of cross belts 141, 142, the belt cover 143, and the supplemental belt 145 correspond to the effective belt plies.

For example, in the configuration of FIG. 3, the pair of cross belts 141, 142, and the supplemental belt 145 are configured by arraying belt cords made of steel covered with coating rubbers at cord angles $\theta 41$, $\theta 42$, $\theta 45$ of 15 degrees or more and 80 degrees or less with respect to the tire circumferential direction. The belt cords made of the steel having a cord diameter φbt (mm) in the range $0.50 \leq \varphi bt \leq 1.80$ and the number of insertions Ebt (piece/50 mm) in the range $15 \leq Ebt \leq 60$ achieve the tensile strength Tbt (N/50 mm) of the cross belts 141, 142 and the supplemental belt 145. The cord diameter φbt (mm) and the number of insertions Ebt (piece/50 mm) are preferably in the range $0.55 \leq \varphi bt \leq 1.60$ and $17 \leq Ebt \leq 50$ and more preferably in the range $0.60 \leq \varphi bt \leq 1.30$ and $20 \leq Ebt \leq 40$. The belt cord is formed by intertwining a plurality of the wire strands, and the wire strand diameter φbts (mm) is in the range $0.16 \leq \varphi bts \leq 0.43$ and preferably in the range $0.21 \leq \varphi bts \leq 0.39$.

The configuration is not limited to the configuration, and the cross belts 141, 142 and the supplemental belt 145 may be constituted by belt cords made of an organic fiber material (for example, aramid, nylon, polyester, rayon, or the like) covered with a coating rubber. In this case, the belt cord made of the organic fiber material has the cord diameter φbt (mm) in the range $0.50 \leq \varphi bt \leq 0.90$ and the number of insertions Ebt (piece/50 mm) in the range $30 \leq Ebt \leq 65$, whereby the above-described tensile strength Tbt (N/50 mm) of the cross belts 141, 142 and the supplemental belt 145 is achieved. Besides, for example, the belt cords made by intertwining a plurality of types of organic fiber materials, such as nylon and aramid, can be employed within the scope of obviousness by one skilled in the art.

Further, a total tensile strength TTbt (N/50 mm) of the belt layer 14 is in the range $70 \leq TTbt/OD \leq 750$, preferably in the range $110 \leq TTbt/OD \leq 690$, more preferably in the range $150 \leq TTbt/OD \leq 600$, and further preferably in the range $170 \leq TTbt/OD \leq 560$ with respect to the tire outer diameter OD (mm). As a result, the load capacity of the entire belt layer 14 is ensured. Further, $0.16 \times P \leq TTbt/OD$ is preferable with the use of a specified internal pressure P (kPa) of the tire.

The total tensile strength TTbt (N/50 mm) of the belt layer 14 is calculated as the sum of the tensile strengths Tbt (N/50 mm) of the effective belt plies (the pair of cross belts 141, 142, the belt cover 143, and the supplemental belt 145 in FIG. 1) described above. Therefore, the total tensile strength TTbt (N/50 mm) of the belt layer 14 increases with an increase in the tensile strength Tbt (N/50 mm) of each belt ply, the number of layered belt plies, and the like.

Further, in FIG. 3, a tensile strength Tbt_min (N/50 mm) of the narrowest belt ply (the cross belt 142 on the radially outer side in FIG. 3) among the pair of cross belts 141, 142 and the supplemental belt 145 is in the range $0.10 \leq Tbt\_min/TTbt \leq 0.40$ and preferably $0.12 \leq Tbt\_min/TTbt \leq 0.35$ with respect to the total tensile strength TTbt (N/50 mm) of the belt layer 14. The lower limit ensures a suppression effect of the outer diameter growth of the tire by the supplemental belt 145, and the upper limit ensures an improvement effect of the belt durability by another belt ply.

In FIG. 3, a width Wbmax (mm) of the widest belt ply (a width Wb1 (mm) of the cross belt 141 on the radially inner side or a width Wb5 (*mm*) of the supplemental belt 145 in FIG. 3) among the pair of cross belts 141, 142 and the supplemental belt 145 is in the range $1.00 \leq Wbmax/Wbmin \leq 1.40$ and preferably in the range $1.10 \leq Wbmax/Wbmin \leq 1.35$ with respect to a width Wbmin (mm) of the narrowest belt ply (a width Wb2 (*mm*) of the cross belt 142 on the radially outer side in FIG. 3). In addition, the width Wbmax (mm) of the widest belt ply is in the range $1.00 \leq Wbmax/Wbmid \leq 1.30$ with respect to a width Wbmid (mm) of the second widest belt ply (the width Wb5 (*mm*) of the supplemental belt 145 or the width Wb1 (*mm*) of the cross belt 141 on the radially inner side in FIG. 3). The width Wbmin (mm) of the narrowest belt ply (the width Wb2 (*mm*) of the cross belt 142 on the radially outer side in FIG. 3) is in the range $0.61 \leq Wbmin/SW \leq 0.96$ and preferably in the range $0.70 \leq Wbmin/SW \leq 0.94$ with respect to the total tire width SW (mm). As a result, there is an advantage that the relationship between the widths Wb1, Wb2, Wb5 of the belt plies 141, 142, 145 is properly set. Specifically, the lower limit ensures the width of the belt ply, properly sets a ground contact pressure distribution of the tire ground contact region, and ensures uneven wear resistance of the tire. The upper limit reduces strain of the end portion of the belt ply during rolling of the tire and suppresses separation of a peripheral rubber of the belt ply end portion.

The width of a belt ply is the distance in the direction of the tire rotation axis between the left and right end portions of each belt ply, measured when the tire is mounted on a specified rim, inflated to a specified internal pressure, and in an unloaded state.

Further, the width Wbmax (mm) of the widest belt ply preferably satisfies the following mathematical formula (5) with respect to the width Wbmin (mm) of the narrowest belt ply and the total tire width SW (mm). Here, Umin=10 and Umax=30 and preferably Umin=11 and Umax=28.

$$U\min/(SW)^{\wedge}(1/2) \leq Wb\max/Wb\min \leq U\max/(SW)^{\wedge}(1/2) \qquad (5)$$

Further, the width Wbmax (mm) of the widest belt ply preferably satisfies the following mathematical formula (6)

with respect to the width Wbmid (mm) of the second widest belt ply and the total tire width SW (mm). Here, Vmin=10.0 and Vmax=26.0, preferably Vmin=10.5 and Vmax=25.0, and more preferably Vmin=10.5 and Vmax=24.0.

$$V\min/(SW)^{\wedge}(1/2) \leq Wb\max/Wb\mathit{mid} \leq V\max/(SW)^{\wedge}(1/2) \qquad (6)$$

The width bmax (mm) of the widest belt ply (the width Wb1 (*mm*) of the cross belt 141 on the radially inner side or the width Wb5 (*mm*) of the supplemental belt 145 in FIG. 3) among the pair of cross belts 141, 142 and the supplemental belt 145 is in the range $0.85 \leq Wbmax/TW \leq 1.23$ and preferably in the range $0.90 \leq Wbmax/TW \leq 1.20$ with respect to the tire ground contact width together with (mm).

For example, in the configurations of FIGS. 1 to 3, the wide cross belt 141 is disposed in the innermost layer in the tire radial direction, and the narrow cross belt 142 is disposed on the outer side of the wide cross belt 141 in the radial direction. In addition, the supplemental belt 145 is the third cross belt having a cord angle of 15 degrees or more and 80 degrees or less, is disposed on the outer side of the narrow cross belt 142 in the radial direction, and has a cord angle having a different sign from the cord angle of the narrow cross belt 142. The belt cover 143 is disposed on the outer side of the supplemental belt 145 in the radial direction to entirely cover the pair of cross belts 141, 142 and the supplemental belt 145. The pair of belt edge covers 144, 144 are disposed on the outer side of the belt cover 143 in the radial direction while being spaced apart from one another to cover respective left and right edge portions of the pair of cross belts 141, 142 and the supplemental belt 145.

Tread Profile and Tread Gauge

Figure 4:
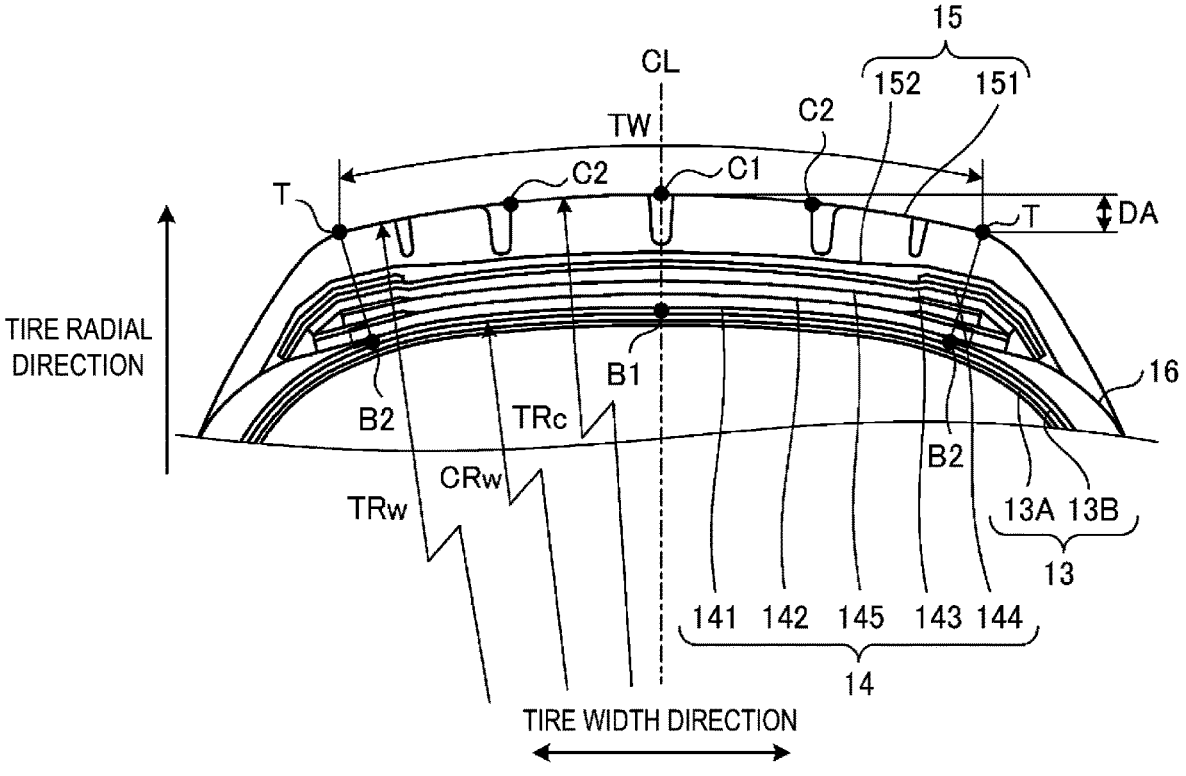
FIG. 4 is an enlarged view illustrating a tread portion of the tire illustrated in FIG. 1.

FIG. 4 is an enlarged view illustrating the tread portion of the tire 1 illustrated in FIG. 1.

In FIG. 4, an amount of depression DA (mm) of the tread profile at a tire ground contact edge T, the tire ground contact width TW (mm), and the tire outer diameter OD (mm) have the relationship $0.015 \leq TW/(DA \times OD) \leq 0.400$ and preferably have the relationship $0.020 \leq TW/(DA \times OD) \leq 0.250$. The amount of depression DA (mm) of the tread profile at the tire ground contact edge T has the relationship $0.008 \leq DA/TW \leq 0.090$ and preferably has the relationship $0.013 \leq DA/TW \leq 0.080$ with respect to the tire ground contact width TW (mm). As a result, a depression angle (defined by the ratio DA/(TW/2)) of a tread portion shoulder region is properly set and the load capacity of the tread portion is appropriately ensured. Specifically, the lower limit ensures the depression angle of the tread portion shoulder region and suppresses a decrease in wear life caused by an excessive ground contact pressure of the tread portion shoulder region. The upper limit flattens the tire ground contact region, uniforms the ground contact pressure, and ensures the wear resistance performance of the tire. In particular, since the small-diameter tire is assumed to be used under a high internal pressure and a high load, the ground contact pressure distribution in the tire ground contact region can be effectively properly set by the configuration. Further, since the carcass tensile strength Tcs of the carcass layer 13 and the belt tensile strength Tbt of the belt layer 14 are reinforced as described above, a situation in which a ground contact pressure becomes excessive is suppressed. On the other hand, the tire having the shoulder portion having the round shape suppresses heat generation of the tread portion during rolling of the tire to improve the durability performance of the tire and reduce a rubber volume of the tread portion to improve the low rolling resistance performance of the tire.

The amount of depression DA is the distance in the tire radial direction from the intersection point C1 between the tire equatorial plane CL and the tread profile in the cross-sectional view in the tire meridian direction to the tire ground contact edge T, and is measured when the tire is mounted on a specified rim, inflated to a specified internal pressure, and in an unloaded state.

The tire profile is a contour line of the tire in a cross-sectional view along the tire meridian direction, and is measured using a laser profiler. The laser profiler used may be, for example, a tire profile measuring device (available from Matsuo Co., Ltd.).

The amount of depression DA (mm) of the tread profile at the tire ground contact edge T preferably satisfies the following mathematical formula (7) with respect to the tire outer diameter OD (mm) and the total tire width SW (mm). Here, Emin=3.5 and Emax=17, preferably Emin=3.8 and Emax=13, and more preferably Emin=4.0 and Emax=9.

$$E\min*(SW/OD)\wedge(1/4) \le DA \le E\max*(SW/OD)\wedge(1/4) \qquad (7)$$

FIG. 4 defines the point C1 on the tread profile on the tire equatorial plane CL and a pair of points C2, C2 on the tread profile at a distance of ¼ of the tire ground contact width TW from the tire equatorial plane CL.

At this time, a radius of curvature TRc (mm) of an arc passing through the point C1 and the pair of points C2 is in the range $0.15 \le TRc/OD \le 12$ and preferably in the range $0.18 \le TRc/OD \le 8.0$ with respect to the tire outer diameter OD (mm). The radius of curvature TRc (mm) of the arc is in the range $30 \le TRc \le 3000$, preferably in the range $50 \le TRc \le 2300$, and more preferably in the range $80 \le TRc \le 2000$. As a result, the load capacity of the tread portion is appropriately ensured. Specifically, the lower limit flattens the tread portion center region, uniforms the ground contact pressure of the tire ground contact region, and ensures the wear resistance performance of the tire. The upper limit suppresses a decrease in wear life caused by an excessive ground contact pressure of the tread portion shoulder region. In particular, since the small-diameter tire is assumed to be used under a high internal pressure and a high load, and thus a uniform effect of the ground contact pressure under such a use condition can be effectively obtained.

The radius of curvature of the arc is measured when the tire is mounted on a specified rim, inflated to a specified internal pressure, and in an unloaded state.

In FIG. 4, a radius of curvature TRw (mm) of an arc passing through the point C1 of the tire equatorial plane CL described above and the left and right tire ground contact edges T, T is in the range $0.20 \le TRw/OD \le 10$ and preferably in the range $0.35 \le TRw/OD \le 8$ with respect to the tire outer diameter OD (mm). The radius of curvature TRw (mm) of the arc is in the range $100 \le TRw \le 2300$ and preferably in the range $150 \le TRw \le 2000$. As a result, the load capacity of the tread portion is appropriately ensured. Specifically, the lower limit flattens the entire tire ground contact region, uniforms the ground contact pressure, and ensures the wear resistance performance of the tire. The upper limit suppresses a decrease in wear life caused by an excessive ground contact pressure of the tread portion shoulder region. In particular, since the small-diameter tire is assumed to be used under a high internal pressure and a high load, the ground contact pressure distribution in the tire ground contact region can be effectively properly set by the configuration.

The radius of curvature TRw (mm) of a first arc passing through the points C1, C2 described above is in the range $0.55 \le TRw/TRc \le 1.00$, preferably in the range $0.65 \le TRw/TRc \le 0.98$, and more preferably in the range $0.75 \le TRw/TRc \le 0.96$ with respect to the radius of curvature TRw (mm) of a second arc passing through the point C1 and the tire ground contact edge T. This sets a contact patch shape of the tire appropriate. Specifically, the lower limit disperses the ground contact pressure of the tread portion center region and improves the wear life of the tire. The upper limit suppresses a decrease in wear life caused by an excessive ground contact pressure of the tread portion shoulder region.

In FIG. 4, a point B1 on the carcass layer 13 on the tire equatorial plane CL and feet B2, B2 of perpendicular lines extending from the left and right tire ground contact edges T, T to the outermost layer of the carcass layer 13 (the carcass ply 13B on the radially outer side in FIG. 4) are defined.

At this time, a radius of curvature CRw of an arc passing through the point B1 and the pair of points B2, B2 is in the range $0.35 \le CRw/TRw \le 1.45$, preferably in the range $0.40 \le CRw/TRw \le 1.40$, and more preferably in the range $0.45 \le CRw/TRw \le 1.35$ with respect to the radius of curvature TRw of the arc passing through the point C1 described above and the tire ground contact edges T, T. The radius of curvature CRw (mm) is in the range $100 \le CRw \le 2500$ and preferably in the range $120 \le CRw \le 2200$. This sets the contact patch shape of the tire more appropriate. Specifically, the lower limit suppresses a decrease in wear life caused by an increase in rubber gauge in the tread portion shoulder region. The upper limit ensures the wear life in the tread portion center region.

Figure 5:
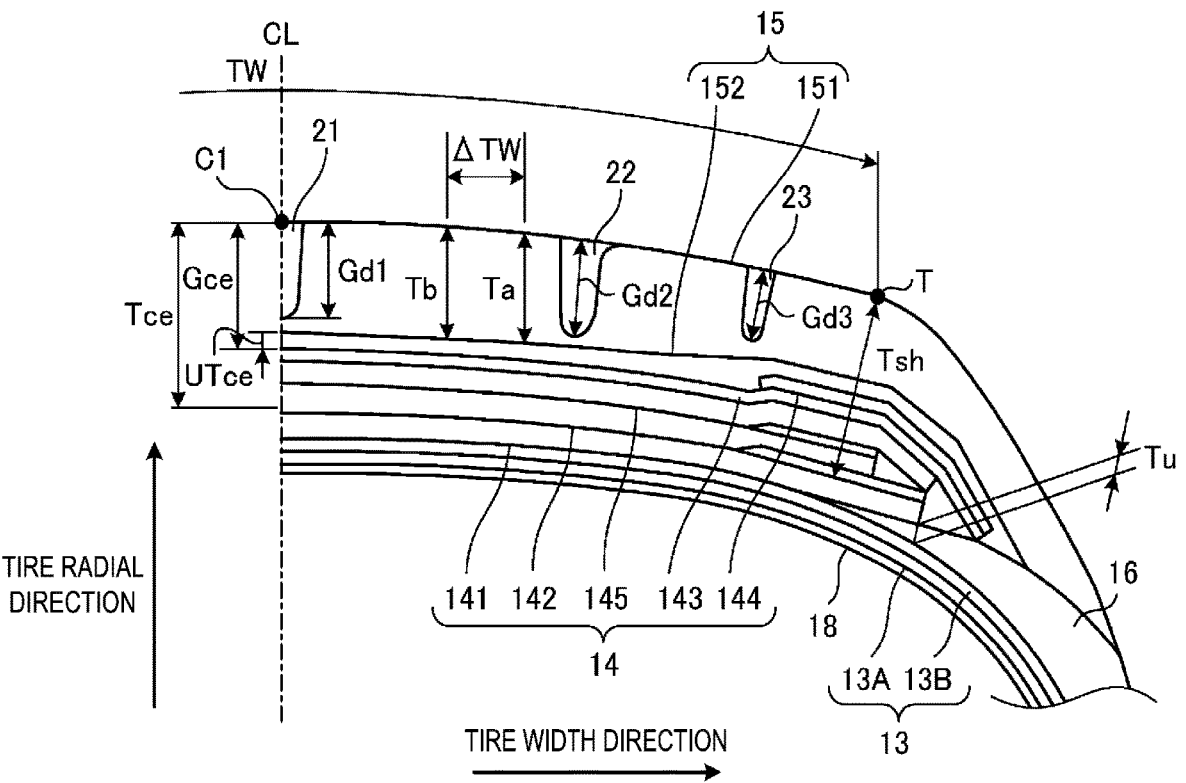
FIG. 5 is an enlarged view illustrating a half region of the tread portion illustrated in FIG. 4.

FIG. 5 is an enlarged view illustrating the half region of the tread portion illustrated in FIG. 4.

In the configuration of FIG. 1, as described above, the belt layer 14 includes the pair of cross belts 141, 142 and the supplemental belt 145 and the tread rubber 15 includes the cap tread 151 and the undertread 152.

In FIG. 5, a distance Tce (mm) from the tread profile on the tire equatorial plane CL to the outer circumferential surface of the wide cross belt 141 has the relationship $0.008 \le Tce/OD \le 0.13$, preferably has the relationship $0.012 \le Tce/OD \le 0.10$, and more preferably has the relationship $0.015 \le Tce/OD \le 0.07$ with respect to the tire outer diameter OD (mm). A distance Tce (mm) is in the range $5 \le Tce \le 25$ and preferably in the range $7 \le Tce \le 20$. As a result, the load capacity of the tread portion is appropriately ensured. Specifically, the lower limit suppresses tire deformation during use under a high load and ensures the wear resistance performance of the tire. In particular, since the small-diameter tire is assumed to be used under a high internal pressure and a high load, the above-described wear resistance performance is significantly obtained. The upper limit suppresses the deterioration of the rolling resistance caused by the increase in the weight of the tread rubber.

The distance Tce is measured when the tire is mounted on a specified rim, inflated to a specified internal pressure, and in an unloaded state.

The outer circumferential surface of the belt ply is defined as a circumferential surface on the outer side in the radial direction of the entire belt ply formed of the belt cords and the coating rubber.

The distance Tce (mm) from the tread profile on the tire equatorial plane CL to the outer circumferential surface of the wide cross belt 141 preferably satisfies the following mathematical formula (8) with respect to the tire outer diameter OD (mm). Here, Fmin=35 and Fmax=207 and preferably Fmin=42 and Fmax=202.

$$Fmin/(OD) \wedge (1/3) \le Tce \le Fmax/(OD) \wedge (1/3) \qquad (8)$$

A distance Tsh (mm) from the tread profile at the tire ground contact edge T to the outer circumferential surface of the wide cross belt 141 is in the range 0.60≤Tsh/Tce≤1.70, preferably in the range 0.85≤Tsh/Tce≤1.55, and more preferably in the range 0.97≤Tsh/Tce≤1.50 with respect to the distance Tce (mm) in the tire equatorial plane CL. The lower limit ensures the tread gauge in the shoulder region, and therefore repeated deformation of the tire during rolling of the tire is suppressed, and the wear resistance performance of the tire is ensured. The upper limit ensures the tread gauge in the center region, and therefore the tire deformation during use under a high load peculiar to the small-diameter tire is suppressed, and the wear resistance performance of the tire is ensured.

The distance Tsh is measured when the tire is mounted on a specified rim, inflated to a specified internal pressure, and in an unloaded state. When a wide cross belt is not present immediately below the tire ground contact edge T, the distance is measured as a distance of an imaginary line of the distance Tsh extending from the outer circumferential surface of the belt ply from the tread profile.

The distance Tsh (mm) from the tread profile to the outer circumferential surface of the wide cross belt 141 in the tire ground contact edge T preferably satisfies the following mathematical formula (9) with respect to the distance Tce (mm) in the tire equatorial plane CL. Here, Gmin=0.36 and Gmax=0.72, preferably Gmin=0.37 and Gmax=0.71, and more preferably Gmin=0.38 and Gmax=0.70.

$$Gmin*(OD) \wedge (1/7) \le Tsh/Tce \le Gmax*(OD) \wedge (1/7) \qquad (9)$$

In FIG. 5, a section having a width ΔTW of 10% of the tire ground contact width TW is defined. At this time, a ratio between a maximum value Ta and a minimum value Tb of the rubber gauge of the tread rubber 15 in any section in the tire ground contact region is in the range of 0% or more and 40% or less and preferably in the range 0% or more and 20% or less. In such a configuration, since an amount of change in the rubber gauge of the tread rubber 15 in any section in the tire ground contact region (in particular, a section including the end portions of the belt plies 141 to 144) is set to be small, the ground contact pressure distribution in the tire width direction smoothens and the wear resistance performance of the tire is improved.

The rubber gauge of the tread rubber 15 is defined as a distance from the tread profile to the inner circumferential surface of the tread rubber 15 (in FIG. 5, a distance from the outer circumferential surface of the cap tread 151 to the inner circumferential surface of the undertread 152). Therefore, the rubber gauge of the tread rubber 15 is measured with a groove formed in a tread contact surface excluded.

In FIG. 5, a rubber gauge UTce of the undertread 152 at the tire equatorial plane CL is in the range 0.04≤UTce/Tce≤0.60 and preferably in the range 0.06≤UTce/Tce≤0.50 with respect to the distance Tce in the tire equatorial plane CL described above. Thus, the rubber gauge UTce of the undertread 152 is properly set.

The above-described distance Tsh in the tire ground contact edge T is in the range 1.50≤Tsh/Tu≤30.0 and preferably in the range 2.00≤Tsh/Tu≤6.70 with respect to a rubber gauge Tu (mm) from the end portion of the innermost layer of the belt layer 14 (the wide cross belt 141 in FIG. 5) to the outer circumferential surface of the carcass layer 13. As a result, the profile of the carcass layer 13 is properly set and tension of the carcass layer 13 is properly set. Specifically, the lower limit ensures the tension of the carcass layer and the tread gauge in the shoulder region, and therefore repeated deformation of the tire during rolling of the tire is suppressed, and the wear resistance performance of the tire is ensured. The upper limit ensures the rubber gauge at or near the end portion of the belt ply, and therefore separation of the peripheral rubber of the belt ply is suppressed.

The rubber gauge Tu is substantially measured as a gauge of a rubber member (the sidewall rubber 16 in FIG. 5) inserted between the end portion of the innermost layer of the belt layer 14 (the wide cross belt 141 in FIG. 5) and the carcass layer 13.

The outer circumferential surface of the carcass layer 13 is defined as a circumferential surface on the outer side in the radial direction of the entire carcass ply formed of the carcass cords and the coating rubber. When the carcass layer 13 has a multilayer structure formed of a plurality of carcass plies (see FIG. 1), the outer circumferential surface of the carcass ply 13B of the outermost layer constitutes the outer circumferential surface of the carcass layer 13. When the turned-up portion 132 (see FIG. 1) of the carcass layer 13 is present between the end portion of the innermost layer of the belt layer 14 and the carcass layer 13 (not illustrated), the outer circumferential surface of the turned-up portion 132 constitutes the outer circumferential surface of the carcass layer 13.

For example, in the configuration of FIG. 5, the sidewall rubber 16 is inserted between the end portion of the wide cross belt 141 and the carcass layer 13 to form the rubber gauge Tu between the end portion of the wide cross belt 141 and the carcass layer 13. However, the configuration is not limited to this, and, for example, a belt cushion may be inserted between the end portion of the wide cross belt 141 and the carcass layer 13 instead of the sidewall rubber 16 (not illustrated). The inserted rubber member has a rubber hardness Hs_sp of 46 or more and 67 or less, a modulus M_sp (MPa) at 100% elongation of 1.0 or more and 3.5 or less, and a loss tangent tan δ_sp of 0.02 or more and 0.22 or less and preferably has the rubber hardness Hs_sp of 48 or more and 63 or less, the modulus M_sp (MPa) at 100% elongation of 1.2 or more and 3.2 or less, and a loss tangent tan δ_sp of 0.04 or more and 0.20 or less.

In the configuration of FIG. 1, the tire 1 includes, in a tread surface: a plurality of circumferential main grooves 21 to 23 extending in the tire circumferential direction (see FIG. 5) and land portions (reference sign omitted in drawings) defined by the circumferential main grooves 21 to 23. "Main groove" refers to a groove having a wear indicator as specified by JATMA mandatorily provided.

At this time, as illustrated in FIG. 5, a groove depth Gd1 (*mm*) of the circumferential main groove 21 closest to the tire equatorial plane CL among the plurality of circumferential main grooves 21 to 23 is in the range 0.50≤Gd1/Gce≤1.00 and preferably in the range 0.55≤Gd1/Gce≤0.98 with respect to a rubber gauge Gce (mm) of the tread rubber 15. Thus, the wear resistance performance of the tire is ensured. Specifically, the lower limit disperses the ground contact pressure of the tread portion center region and improves the wear life of the tire. The upper limit ensures the rigidity of the land portion and ensures the rubber gauge from the groove bottom of the circumferential main groove 21 to the belt layer.

The circumferential main groove closest to the tire equatorial plane CL is defined as the circumferential main groove 21 (see FIG. 5) on the tire equatorial plane CL. When a circumferential main groove is absent on the tire equatorial plane CL (not illustrated), the circumferential main groove is defined as the circumferential main groove closest to the tire equatorial plane CL.

The ratio Gd1/Gce described above preferably satisfies the following mathematical formula (10) with respect to the tire outer diameter OD (mm). Here, Hmin=0.10 and Hmax=0.60, preferably Hmin=0.12 and Hmax=0.50, and more preferably Hmin=0.14 and Hmax=0.40.

$$Hmin * 250/OD \le Gd1/Gce \le Hmax + 250/OD \qquad (10)$$

A groove depth Gd1 (*mm*) of the circumferential main groove 21 closest to the tire equatorial plane CL among the plurality of circumferential main grooves 21 to 23 is deeper than groove depths Gd2 (*mm*), Gd3 (*mm*) of the other circumferential main grooves 22, 23 (Gd2<Gd1, Gd3<Gd1). Specifically, when a region from the tire equatorial plane CL to the tire ground contact edge T is bisected in the tire width direction, the groove depth Gd1 of the circumferential main groove (reference sign omitted in drawings) closest to the tire equatorial plane CL is in the range of 1.00 times or more and 2.50 times or less, preferably in the range of 1.00 times or more and 2.00 times or less, and more preferably in the range of 1.00 times or more and 1.80 times or less with respect to the maximum values of the groove depths Gd2, Gd3 of the other circumferential main grooves (reference sign omitted in drawings) in the region on the tire ground contact edge T side. The lower limit disperses the ground contact pressure of the tread portion center region and improves the wear resistance performance of the tire. The upper limit suppresses uneven wear caused by the excessive ground contact pressure difference between the tread portion center region and the shoulder region.

Side Profile and Side Gauge

Figure 6:
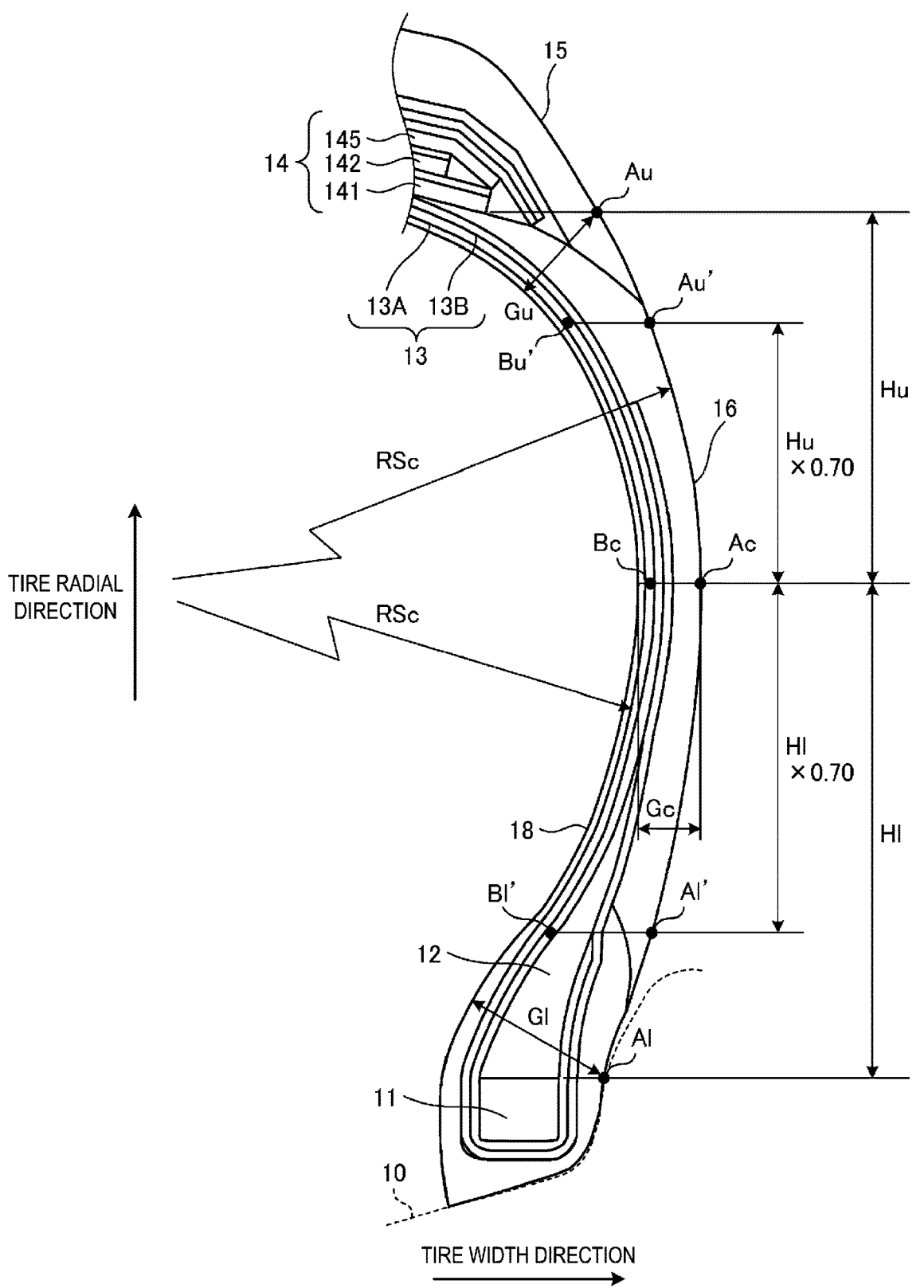
FIG. 6 is an enlarged view illustrating a sidewall portion and a bead portion of the tire illustrated in FIG. 1.
Figure 7:
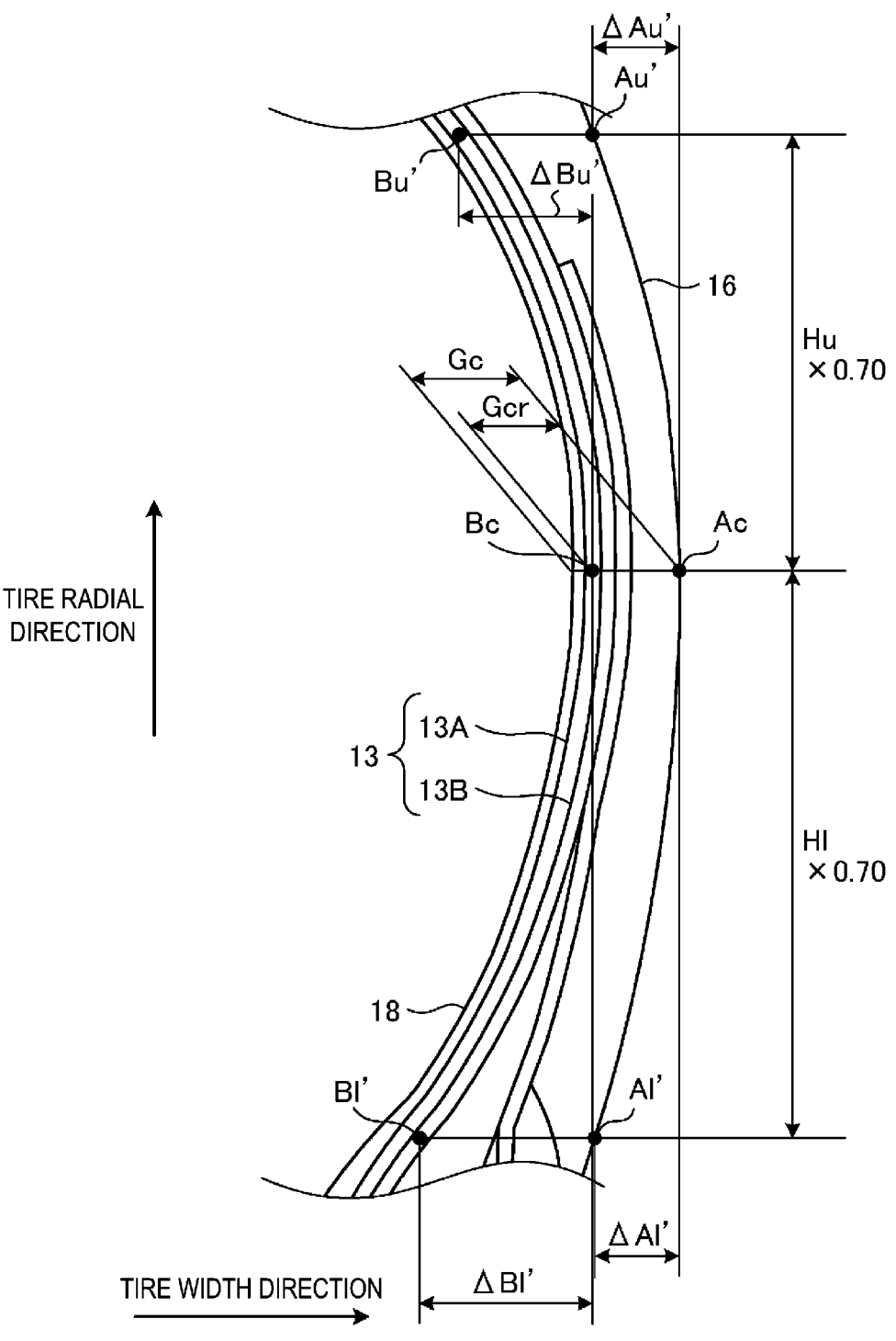
FIG. 7 is an enlarged view illustrating the sidewall portion illustrated in FIG. 6.

FIG. 6 is an enlarged view illustrating the sidewall portion and the bead portion of the tire 1 illustrated in FIG. 1. FIG. 7 is an enlarged view illustrating the sidewall portion illustrated in FIG. 6.

In FIG. 6, the point Au on the side profile at the same position as the end portion of the innermost layer of the belt layer 14 (in FIG. 6, the cross belt 141 on the radially inner side) in the tire radial direction and a point A1 on the side profile at the same position as the end portion on the outer side in the radial direction of the bead core 11 in the tire radial direction are defined. The distance Hu from the tire maximum width position Ac to the point Au in the tire radial direction and a distance Hl from the tire maximum width position Ac to the point Al in the tire radial direction are defined. The point Au' on the side profile at a radial position of 70% of the distance Hu from the tire maximum width position Ac and a point Al' on the side profile at a radial position of 70% of the distance Hl from the tire maximum width position Ac are defined.

At this time, the sum of the distance Hu (mm) and the distance Hl (mm) is in the range 0.45≤(Hu+Hl)/SH≤0.90 and preferably in the range 0.50≤(Hu+Hl)/SH≤0.85 with respect to the tire cross-sectional height SH (mm) (see FIG. 2). In this way, the redial distance from the belt layer 14 to the bead core 11 is appropriately set. Specifically, the lower limit ensures a deformable region of the tire side portion and suppresses a failure of the tire side portion (for example, separation of the rubber member at the end portion on the outer side of the bead filler 12 in the radial direction). The upper limit reduces the amount of deflection of the tire side portion during rolling of the tire and reduces the rolling resistance of the tire.

The distance Hu and the distance Hl are measured when the tire is mounted on a specified rim, inflated to a specified internal pressure, and in an unloaded state.

The sum of the distance Hu (mm) and the distance Hl (mm) preferably satisfies the following mathematical formula (11) with respect to the tire outer diameter OD (FIG. 1), the tire cross-sectional height SH (mm) (see FIG. 2), and a radius of curvature RSc (mm) of an arc passing through the tire maximum width position Ac, the point Au', and the point Al'. Here, I1min=0.06, I1max=0.20, and I2=0.70 and preferably I1min=0.09, I1max=0.20, and I2=0.65.

$$I1min * (OD/RSc) \wedge \qquad (11)$$
$$(1/2) \le (Hu + Hl)/SH \le I2 + I1max * (RSc/OD) \wedge (1/2)$$

The radius of curvature RSc of the arc is measured when the tire is mounted on a specified rim, inflated to a specified internal pressure, and in an unloaded state.

The distance Hu (mm) and the distance H1 (mm) have the relationship 0.30≤Hu/(Hu+≤0.70 and preferably have the relationship 0.35≤Hu/(Hu+Hl)≤0.65. Accordingly, the position of the tire maximum width position Ac in the deformable region of the tire side portion is properly set. Specifically, the lower limit alleviates stress concentration at or near the end portion of the belt ply caused by the tire maximum width position Ac being excessively close to the end portion of the belt layer 14 and suppresses the separation of the peripheral rubber. The upper limit alleviates stress concentration at or near the bead portion caused by the tire maximum width position Ac being excessively close to the end portion of the bead core 11 and suppresses a failure of a reinforcing member (the bead filler 12 in FIG. 6) of the bead portion.

The radius of curvature RSc (mm) of the arc passing through the tire maximum width position Ac, the point Au', and the point Al' is in the range 0.05≤RSc/OD≤1.70 and preferably in the range 0.10≤RSc/OD≤1.60 with respect to the tire outer diameter OD (mm). The radius of curvature RSc (mm) of the arc is in the range 25≤RSc≤330 and preferably in the range 30≤RSc≤300. As a result, the radius of curvature of the side profile is properly set and the load capacity of the tire side portion is appropriately ensured. Specifically, the lower limit reduces the amount of deflection of the tire side portion during rolling of the tire and reduces the rolling resistance of the tire. The upper limit suppresses stress concentration caused by the tire side portion becoming flat and improves durability performance of the tire. In particular, in the small-diameter tire, since large stress tends to act on the tire side portion due to the use under the high internal pressure and the high load described above, there is also a problem that side cut resistance performance of the tire should be ensured. In this regard, the lower limit ensures the radius of curvature of the side profile, suppresses a collapse of the tire by carcass tension being properly set, and suppresses side cut of the tire. The upper limit suppresses the side cut of the tire caused by an excessive tension of the carcass layer 13.

The radius of curvature RSc (mm) of the arc is in the range 0.50≤RSc/SH≤0.95 and preferably in the range 0.55≤RSc/SH≤0.90 with respect to the tire cross-sectional height SH (mm).

The radius of curvature RSc (mm) of the arc preferably satisfies the following mathematical formula (12) with respect to the tire outer diameter OD (mm) and the rim diameter RD (mm). Here, Jmin=15 and Jmax=360, preferably Jmin=20 and Jmax=330, and more preferably Jmin=25 and Jmax=300.

$$J\min * (OD/RD) \wedge (1/2) \le RSc \le J\max + (OD/D) \wedge (1/2) \qquad (12)$$

In FIG. 6, a point Bc on the body portion 131 of the carcass ply 13A of the innermost layer of the carcass layer 13 at the same position as the tire maximum width position Ac in the tire radial direction is defined. A point Bu' on the body portion 131 of the carcass ply 13A of the innermost layer at a radial position of 70% of the above-described distance Hu from the tire maximum width position Ac is defined. A point Bl' on the body portion 131 of the carcass ply 13A of the innermost layer at a radial position of 70% of the above-described distance Hl from the tire maximum width position Ac is defined.

At this time, the radius of curvature RSc (mm) of the arc passing through the tire maximum width position Ac, the point Au' and the point Al' described above is in the range 1.10≤RSc/RCc≤4.00 and preferably in the range 1.50≤RSc/RCc≤3.50 with respect to the radius of curvature RCc (mm) of the arc passing through the point Bc, the point Bu' and the point Bl'. The radius of curvature RCc (mm) of the arc passing through the point Bc, the point Bu' and the point Bl' is in the range 5≤RCc≤300 and preferably in the range 10≤RCc≤270. Thus, the relationship between the radius of curvature RSc of the side profile of the tire and the radius of curvature RCc of the side profile of the carcass layer 13 is properly set. Specifically, the lower limit ensures the radius of curvature RCc of the carcass profile, ensures the internal volume V of the tire described later, and ensures the load capacity of the tire. The upper limit ensures the total gauges Gu and Gl of the tire side portion described later and ensures the load capacity of the tire side portion.

The radius of curvature RSc (mm) of the side profile described above preferably satisfies the following mathematical formula (13) with respect to the radius of curvature RCc (mm) of the carcass profile and the tire outer diameter OD (mm). Here, Kmin=1 and Kmax=130, preferably Kmin=2 and Kmax=100, and more preferably Kmin=3 and Kmax=70.

$$K\min * (OD/RSc) \wedge (1/2) \le RCc \le K\max * (OD/RSc) \wedge (1/2) \qquad (13)$$

In FIG. 6, the total gauge Gu (mm) of the tire side portion at the above-described point Au is in the range 0.010≤Gu/OD≤0.080 and preferably in the range 0.017≤Gu/OD≤0.070 with respect to the tire outer diameter OD (mm). Accordingly, the total gauge Gu in the region on the outer side of the tire side portion in the radial direction is properly set. Specifically, the lower limit ensures the total gauge Gu in the region on the outer side of the tire side portion in the radial direction, suppresses the tire deformation during use under a high load, and ensures the wear resistance performance of the tire. In particular, since the small-diameter tire is assumed to be used under a high internal pressure and a high load, the above-described reduction effect of the rolling resistance of the tire is significantly obtained. The upper limit suppresses the deterioration of the rolling resistance of the tire caused by the total gauge Gu being excessive.

The total gauge of the tire side portion is measured as a distance from the side profile to the tire inner surface on a perpendicular line drawn from a predetermined point on the side profile to the body portion 131 of the carcass layer 13.

In FIG. 6, the total gauge Gu (mm) at the above-described point Au is in the range 1.20≤Gu/Gc≤5.00 and preferably the ratio Gu/Gc is in the range 1.30≤Gu/Gc≤3.00 with respect to the total gauge Gc (mm) of the tire side portion at the tire maximum width position Ac. Accordingly, the gauge distribution of the tire side portion from the tire maximum width position Ac to the innermost layer of the belt layer 14 is properly set. Specifically, the lower limit ensures the total gauge Gu in the region on the outer side in the radial direction, suppresses the tire deformation during use under a high load, and ensures the wear resistance performance of the tire. The upper limit suppresses the deterioration of the rolling resistance of the tire caused by the total gauge Gu being excessive.

The total gauge Gu (mm) at the above-described point Au preferably satisfies the following mathematical formula (14) with respect to the total gauge Gc (mm) at the tire maximum width position Ac and the tire outer diameter OD (mm). Here, Lmin=0.10 and Lmax=0.70, preferably Lmin=0.14 and Lmax=0.70, and more preferably Lmin=0.19 and Lmax=0.70.

$$L\min * (OD) \wedge (1/3) * Gc \le Gu \le L\max * (OD) \wedge (1/3) * Gc \qquad (14)$$

In FIG. 6, the total gauge Gc (mm) of the tire side portion at the tire maximum width position Ac has the relationship 0.003≤Gc/OD≤0.060 with respect to the tire outer diameter OD (mm) and preferably has the relationship 0.004≤Gc/OD≤0.050. The lower limit ensures the total gauge Gc at the tire maximum width position Ac and ensures the load capacity of the tire. The upper limit ensures the reduction effect of the rolling resistance of the tire by reducing the total gauge Gc at the tire maximum width position Ac.

The total gauge Gc (mm) at the tire maximum width position Ac preferably satisfies the following mathematical formula (15) with respect to the tire outer diameter OD (mm). Here, Mmin=70 and Mmax=450 and preferably Mmin=80 and Mmax=400.

$$M\min / (OD) \wedge (1/2) \le Gc \le M\max / (OD) \wedge (1/2) \qquad (15)$$

The total gauge Gc (mm) at the tire maximum width position Ac preferably satisfies the following mathematical formula (16) with respect to the tire outer diameter OD (mm) and the total tire width SW (mm). Here, Nmin=0.20 and Nmax=15, preferably Nmin=0.40 and Nmax=15, and more preferably Nmin=0.60 and Nmax=12.

$$N\min * (OD/SW) \le Gc \le N\max * (OD/SW) \qquad (16)$$

The total gauge Gc (mm) at the tire maximum width position Ac preferably satisfies the following mathematical formula (17) with respect to the radius of curvature RSc (mm) of the arc passing through the tire maximum width position Ac, the point Au', and the point A1' described above. Here, Omin=13 and Omax=260 and preferably Omin=20 and Omax=200.

$$Omin/(RSc) \wedge (1/2) \leq Gc \leq Omax/(RSc) \wedge (1/2) \qquad (17)$$

In FIG. 6, the total gauge Gl (mm) of the tire side portion at the above-described point A1 is in the range 0.010≤Gl/OD≤0.150 and preferably in the range 0.015≤Gl/OD≤0.100 with respect to the tire outer diameter OD. Accordingly, the total gauge Gl in the region on the inner side of the tire side portion in the radial direction is properly set. Specifically, the lower limit ensures the total gauge Gl in the region on the inner side of the tire side portion in the radial direction, suppresses the tire deformation during use under a high load, and ensures the wear resistance performance of the tire. In particular, since the small-diameter tire is assumed to be used under a high internal pressure and a high load, the above-described reduction effect of the rolling resistance of the tire is significantly obtained. The upper limit suppresses the deterioration of the rolling resistance of the tire caused by the total gauge Gl being excessive.

In FIG. 6, the ratio Gl/Gc of the total gauge Gl (mm) of the tire side portion at the point A1 to the total gauge Gc (mm) of the tire side portion at the tire maximum width position Ac is in the range 1.00≤Gl/Gc≤7.00 and preferably the ratio Gu/Gc is in the range 2.00≤Gl/Gc≤5.00. Accordingly, the gauge distribution of the tire side portion from the tire maximum width position Ac to the bead core 11 is properly set. Specifically, the lower limit ensures the total gauge Gu in the region on the inner side in the radial direction, suppresses the tire deformation during use under a high load, and ensures the wear resistance performance of the tire. The upper limit suppresses the deterioration of the rolling resistance of the tire caused by the total gauge Gl being excessive.

The total gauge Gl (mm) of the tire side portion at the above-described point A1 preferably satisfies the following mathematical formula (18) with respect to the total gauge Gc (mm) at the tire maximum width position Ac and the tire outer diameter OD (mm). Here, Pmin=0.12 and Pmax=1.00, preferably Pmin=0.15 and Pmax=1.00, and more preferably Pmin=0.18 and Pmax=1.00.

$$Pmin*(OD) \wedge (1/3)*Gc \leq Gl \leq Pmax*(OD) \wedge (1/3)*Gc \qquad (18)$$

In FIG. 6, the total gauge Gl (mm) at the point A1 described above is in the range 0.80≤Gl/Gu≤5.00 and preferably in the range 0.85≤Gl/Gu≤4.00 with respect to the total gauge Gu (mm) at the point Au described above. Accordingly, the ratio between the total gauge Gl in the region on the outer side in the radial direction and the total gauge Gu in the region on the inner side in the radial direction of the tire side portion is properly set.

The total gauge Gl (mm) at the above-described point A1 preferably satisfies the following mathematical formula (19) with respect to the total gauge Gu (mm) at the above-described point Au and the tire outer diameter OD (mm).

Here, Qmin=0.09 and Qmax=0.80, preferably Qmin=0.10 and Qmax=0.70, and more preferably Qmin=0.11 and Qmax=0.50.

$$Qmin*(OD) \wedge (1/3)*Gu \leq Gl \leq Qmax*(OD) \wedge (1/3)*Gu \qquad (19)$$

In FIG. 6, an average rubber hardness Hsc at the measurement position of the total gauge Gc, an average rubber hardness Hsu at the measurement position of the total gauge Gu, and an average rubber hardness Hsl at the measurement point position of the total gauge Gl have the relationship Hsc≤Hsu<Hsl, preferably have the relationship 1≤Hsu−Hsc≤18 and 2≤Hsl−Hsu≤27, and more preferably have the relationship 2≤Hsu−Hsc≤15 and 5≤Hsl−Hsu≤23. Accordingly, the relationship between the rubber hardnesses of the side portion is properly set.

The average rubber hardnesses Hsc, Hsu, Hsl are calculated as the sum of values obtained by dividing the product of the cross-sectional lengths and the rubber hardnesses of the respective rubber members at the respective measurement points of the total gauge Gc (mm) at the tire maximum width position Ac, the total gauge Gu at the point Au, and the total gauge Gl at the point A1 by the total gauge.

In FIG. 7, a distance ΔAu' (mm) from the tire maximum width position Ac to the point Au' in the tire width direction is in the range 0.03≤ΔAu'/(Hu×0.70)≤0.23 and preferably in the range 0.07≤ΔAu'/(Hu×0.70)≤0.17 with respect to 70% of the distance Hu (mm) from the tire maximum width position Ac described above. Thus, a degree of curvature of the side profile in the region on the outer side in the radial direction is properly set. Specifically, the lower limit suppresses stress concentration caused by the flat tire side portion and improves the durability performance of the tire. The upper limit reduces the amount of deflection of the tire side portion during rolling of the tire and reduces the rolling resistance of the tire. In particular, in the small-diameter tire, since large stress tends to act on the tire side portion due to the use under the high internal pressure and the high load described above, there is also a problem that side cut resistance performance of the tire should be ensured. In this regard, the lower limit ensures the radius of curvature of the side profile, suppresses a collapse of the tire by carcass tension being properly set, and suppresses side cut of the tire. The upper limit suppresses the side cut of the tire caused by an excessive tension of the carcass layer 13.

The distance ΔAl' (mm) from the tire maximum width position Ac to the point A1' in the tire width direction is in the range 0.03≤ΔAl'/(Hl×0.70)≤0.28 and preferably in the range 0.07≤ΔAl'/(Hl×0.70)≤0.20 with respect to 70% of the distance Hl (mm) from the tire maximum width position Ac. Thus, the degree of curvature of the side profile in the region on the inner side in the radial direction is properly set. Specifically, the lower limit suppresses stress concentration caused by the flat tire side portion and improves the durability performance of the tire. In particular, in the small-diameter tire, since the bead core 11 is reinforced as described above, the stress concentration at and near the bead core 11 is effectively suppressed. The upper limit reduces the amount of deflection of the tire side portion during rolling of the tire and reduces the rolling resistance of the tire.

The distances ΔAu' and ΔAl' are measured when the tire is mounted on a specified rim, inflated to a specified internal pressure, and in an unloaded state.

The distance ΔAu' (mm) from the tire maximum width position A c to the point Au' in the tire width direction preferably satisfies the following mathematical formula (20) with respect to the radius of curvature RSc (mm) of the arc passing through the tire maximum width position Ac, the point Au', and the point A1' described above. Here, Rmin=0.05 and Rmax=5.00 and preferably Rmin=0.10 and Rmax=4.50.

$$R\min * (RSc) \wedge (1/2) \leq \Delta Au' \leq R\max * (RSc) \wedge (1/2) \tag{20}$$

In FIG. 7, a distance ΔBu' (mm) from the point Bc to the point Bu' in the tire width direction is in the range 1.10≤ΔBu'/ΔAu'≤8.00 and preferably in the range 1.60≤ΔBu'/ΔAu'≤7.50 with respect to the distance ΔAu' (mm) from the tire maximum width position to the point Au' in the tire width direction. Thus, the relationship between the degree of curvature of the side profile and the degree of curvature of the carcass profile in the region on the outer side in the radial direction is properly set. Specifically, the lower limit ensures the cut resistance performance of the tire side portion. The upper limit ensures the tension of the carcass layer 13, ensures the rigidity of the tire side portion, and ensures the load capacity and the durability performance of the tire.

In FIG. 7, a distance ΔBl' (mm) from the point Bc to the point Bl' in the tire width direction is in the range 1.80≤ΔBl'/ΔAl'≤11.0 and preferably in the range 2.30≤ΔBl'/ΔAl'≤9.50 with respect to the distance ΔAl' (mm) from the tire maximum width position Ac to the point Al' in the tire width direction. Thus, the relationship between the degree of curvature of the side profile and the degree of curvature of the carcass profile in the region on the inner side in the radial direction is properly set. Specifically, the lower limit ensures the total gauge Gl of the tire side portion and ensures the load capacity of the tire side portion. The upper limit ensures the tension of the carcass layer 13, ensures the rigidity of the tire side portion, and ensures the load capacity and the durability performance of the tire.

The distances ΔBu', ΔBl' are measured when the tire is mounted on a specified rim, inflated to a specified internal pressure, and in an unloaded state.

The distance ΔBu' (mm) from the point Bc to the point Bu' in the tire width direction preferably satisfies the following mathematical formula (21) with respect to the radius of curvature RC c (mm) of the arc passing through the point Bc, the point Bu', and the point Bl' described above. Here, Smin=0.40 and Smax=7.0 and preferably Smin=0.50 and Smax=6.0.

$$S\min * (RSc) \wedge (1/2) \leq \Delta Bu' \leq S\max * (RSc) \wedge (1/2) \tag{21}$$

In FIG. 7, a rubber gauge Gcr (mm) of the sidewall rubber 16 at the tire maximum width position Ac is in the range 0.40≤Gcr/Gc≤0.90 with respect to the total gauge Gc (mm) at the tire maximum width position Ac described above. The rubber gauge Gcr (mm) of the sidewall rubber 16 is in the range 1.5≤Gcr and preferably in the range 2.5≤Gcr. The lower limit ensures the rubber gauge Gcr (mm) of the sidewall rubber 16 and ensures the load capacity of the sidewall portion.

The rubber gauge Gcr (mm) of the sidewall rubber 16 at the tire maximum width position Ac preferably satisfies the following mathematical formula (22) with respect to the total gauge Gc (mm) at the tire maximum width position Ac described above and the tire outer diameter OD (mm). Here, Tmin=80 and Tmax=0.90 and preferably Tmin=120 and Tmax=0.90.

$$Gc * (T\min / OD) \leq Gcr \leq Gc * T\max \tag{22}$$

In FIG. 7, a rubber gauge Gin (mm) (not illustrated) of the innerliner 18 at the tire maximum width position Ac is in the range 0.03≤Gin/Gc≤0.50 and preferably in the range 0.05≤Gin/Gc≤0.40 with respect to the total gauge Gc (mm) at the tire maximum width position Ac. As a result, the inner surface of the carcass layer 13 is appropriately protected.

Carcass Ply and Belt Ply

Figure 8:
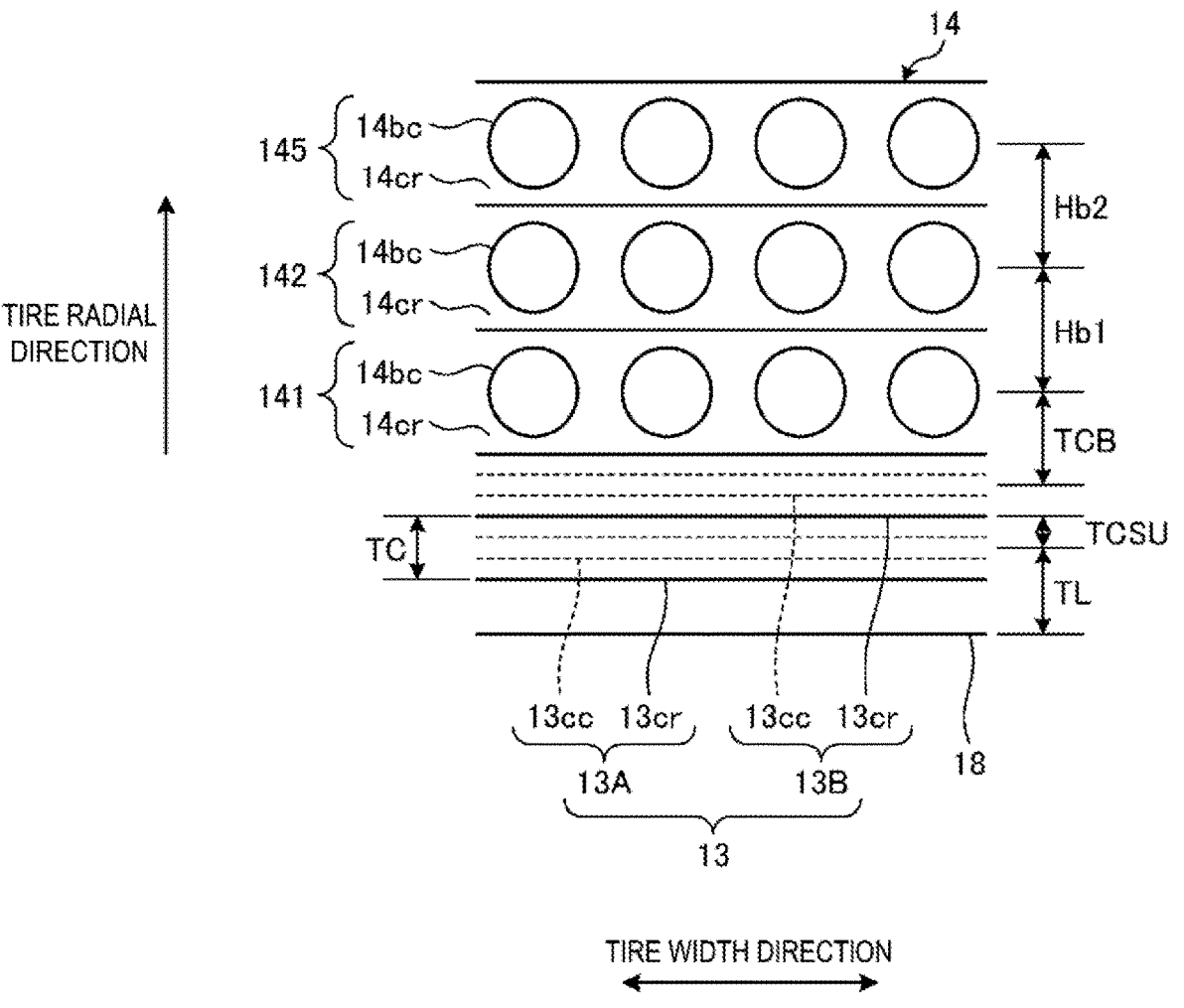
FIG. 8 is an explanatory diagram illustrating a multilayer structure of a carcass layer and a belt layer of the tire illustrated in FIG. 1.

FIG. 8 is an explanatory diagram illustrating the multi-layer structure of the carcass layer and the belt layer of the tire illustrated in FIG. 1. The drawing illustrates an enlarged view in a cross-sectional view in the tire meridian direction.

In the configuration of FIG. 1, as illustrated in FIG. 8, the carcass layer 13 is formed by layering the two layers of the carcass plies 13A, 13B formed by covering carcass cords 13cc with coating rubbers 13cr, and the belt layer 14 is formed by layering the pair of cross belts 141, 142 formed by covering belt cords 14bc with coating rubbers 14cr and the supplemental belt 145. Further, the innerliner 18 is disposed to cover the inner circumferential surface of the carcass layer 13.

Further, in FIG. 8, a distance TL (mm) from the center of the outer diameter of the carcass cord 13cc of the carcass ply of the innermost layer (the carcass ply 13A on the radially inner side in FIG. 8) to the tire inner surface is in the range 0.001≤TL/OD≤0.009 and preferably in the range 0.002≤TL/OD≤0.008 with respect to the tire outer diameter OD (mm) (see FIG. 1). In addition, the distance TL (mm) is in the range 0.003≤TL/SW≤0.025 and preferably in the range 0.004≤TL/SW≤0.020 with respect to the total tire width SW (mm) (see FIG. 1). The lower limit appropriately suppresses an air leakage, and the upper limit suppresses the increase in tire weight.

The distance TL (mm) is calculated as an average value in a region between the above-described two points B2, B2 (see FIG. 4).

Further, the distance TL (mm) is in the range 1/80000≤TL/(SW×(OD−RD))≤1/3760 with respect to the total tire width SW (mm), the tire outer diameter OD (mm), and the rim diameter RD (mm) (see FIG. 1).

In FIG. 8, a distance TCSU (mm) from the center of the carcass cord 13cc of the carcass ply of the innermost layer (the carcass ply 13A on the radially inner side in FIG. 8) to the outer surface of the carcass ply 13A of the innermost layer is in the range 0.09≤TCSU/TL≤1.00 and preferably in the range 0.10≤TCSU/TL≤0.90 with respect to the distance TL (mm) from the center of the carcass cord 13cc of the carcass ply 13A of the innermost layer to the tire inner surface. The lower limit appropriately suppresses an air leakage, and the upper limit suppresses the increase in tire weight.

In FIG. 8, a modulus MC (MPa) at 100% elongation of the coating rubbers 13cr of the carcass plies 13A, 13B is in the range MIL≤MC≤MB with respect to a modulus MIL (MPa) at 100% elongation of the innerliner 18 and a modulus MB (MPa) at 100% elongation of the coating rubber 14cr of the belt ply 141 of the innermost layer of the belt layer 14. A ratio MC/MIL is in the range 1.00≤MC/MIL≤3.00 and preferably in the range 1.10≤MC/MIL≤2.30. A ratio MB/MC is in the range 1.00≤MB/MC≤2.40 and preferably in the range 1.00≤MB/MC≤2.00. Further, the modulus MC (MP a) of the coating rubbers 13cr of the carcass plies 13A, 13B is in the range 1.5≤MC≤12.0 and preferably in the range 2.0≤MC≤10.0. Thus, an air leakage is appropriately suppressed and the durability performance of the tire is ensured.

In FIG. 8, a product of a thicknesses TC (mm) of the carcass plies 13A, 13B and a loss tangent tan δ at 60° C. of the coating rubbers 13cr of the carcass plies 13A, 13B is in the range 0.08≤TC×tan δ≤0.45 and preferably in the range 0.10≤TC×tan δ≤0.40. As a result, the heat generation of the carcass layer 13 is appropriately suppressed and the durability performance of the tire is ensured.

When the carcass cords 13cc of the carcass plies 13A, 13B are made of an organic fiber material, the cord diameter φcs (mm) of the carcass cords 13cc preferably satisfies the following mathematical formula (23) with respect to the tensile strength Tcs (N/50 mm) of the carcass plies 13A, 13B, the number of layers Pcs (piece) of the carcass plies 13A, 13B, and a sum total Ncs (piece) of the number of insertions of the carcass cords in the single carcass ply 13A, 13B.

$$(Tcs/(250*Pcs*Ncs*\pi))^{(1/2)} \le \qquad\qquad (23)$$
$$\varphi cs \le (Tcs/(125*Pcs*Ncs*\pi))^{(1/2)}$$

When the carcass cords 13cc of the carcass plies 13A, 13B are made of an organic fiber material, the number of insertions Ecs (piece/50 mm) preferably satisfies the following mathematical expression (24) with respect to the cord diameter φcs (mm) of the carcass cord 13cc.

$$44/(\pi*\varphi cs^2) \le Ecs \le 80/(\pi*\varphi cs^2) \qquad\qquad (24)$$

In FIG. 8, when the carcass cords 13cc of the carcass plies 13A, 13B are made of an organic fiber material, a peel strength Hpp (N/25 mm) per a width of 25 mm between the carcass ply 13B of the outermost layer of the carcass layer 13 and the belt ply of the innermost layer of the belt layer 14 (the cross belt 141 on the radially inner side in FIG. 8) is in the range 90≤Hpp/TCB≤300 and preferably 100≤Hpp/TCB≤250 with respect to a distance TCB (mm) from the center of the outer diameter of the carcass cords 13cc of the carcass ply 13B to the center of the outer diameter of the belt cord 14bc of the belt ply 141. Further, the peel strength Hpp (N/25 mm) is in the range 1.50≤Hpp/Ecs≤15.0 and in the range 1.80≤Hpp/Ecs≤10.0 with respect to the number of insertions Ecs (piece/50 mm) of the carcass cords 13cc of the carcass plies. Thus, the durability of the tire is ensured.

A test sample having a rectangular shape elongated in the extension direction of the carcass cord, a width of 25 mm, and a length of 100 mm or more (preferably, a length of 150 mm or more including a test tong hold of about 50 mm) is used and the peel strength Hpp (N/25 mm) is calculated as an average value of the maximum value and the minimum value of peak values of an analyzed wavy curve. The number of test samples is preferably 2 or more.

In FIG. 8, when the carcass cords 13cc of the carcass plies 13A, 13B are made of an organic fiber material, the peel strength Hpp (N/25 mm) per a width of 25 mm between the carcass ply 13B of the outermost layer of the carcass layer 13 and the belt ply of the innermost layer of the belt layer 14 (the cross belt 141 on the radially inner side in FIG. 8) preferably satisfies the following formula (25) with respect to the distance TCB from the center of the outer diameter of the carcass cord 13cc of the carcass ply 13B of the outermost layer of the carcass layer 13 to the center of the outer diameter of the belt cord 14bc of the belt ply 141 of the innermost layer of the belt layer 14, the cord diameter φcs (mm) of the carcass cord 13cc, and the number of insertions Ecs (piece/50 (mm)).

$$5000*TCB/(Ecs-\varphi cs) \le Hpp \le 10000*TCB/(Ecs-\varphi cs) \qquad (25)$$

Further, in FIG. 8, inter-cord distances Hb of the belt plies adjacent to one another among the pair of cross belts 141, 142 and the supplemental belt 145 (an inter-cord distance Hb1 between cords of the pair of cross belts 141, 142 and an inter-cord distance Hb2 between the cross belt on the radially outer side and the supplemental belt 145 in FIG. 8) are defined. At this time, an inter-cord distance Hb_sh (not illustrated) at end portions of at least one set of belt plies is in the range 1.05≤Hb_sh/Hb_ce≤2.00 and preferably in the range 1.50≤Hb_sh/Hb_ce≤1.80 with respect to an inter-cord distance Hb_ce (not illustrated) in the tire equatorial plane CL. Therefore, the inter-cord distance Hb is preferably set to large in the tread portion center region. The lower limit allows effectively obtaining the suppression effect of the tire outer diameter growth by the belt layer 14, and the upper limit ensures the durability of the belt layer. The above-described configuration is achieved by, for example, a configuration in which the gauge of the coating rubber of the belt ply is increased in the tread portion center region and a configuration in which an additional rubber sheet is inserted between adjacent belt plies (not illustrated).

Modified Example 1

Figure 9:
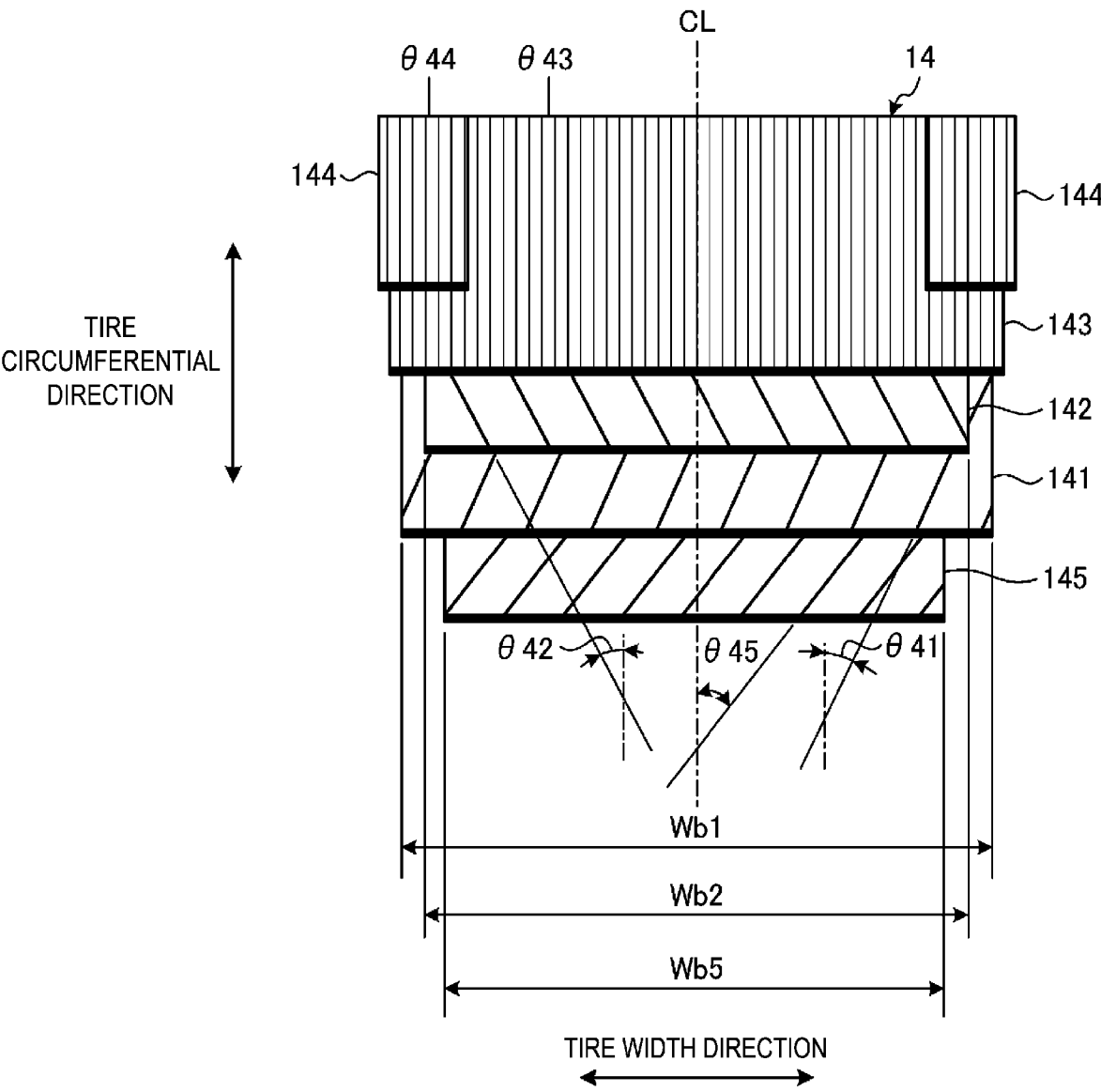
FIG. 9 is an explanatory diagram illustrating Modified Example 1 of the tire illustrated in FIG. 1.

FIG. 9 is an explanatory diagram illustrating Modified Example 1 of the tire 1 illustrated in FIG. 1. The same drawing illustrates the multilayer structure of the belt layer 14. In the same drawing, the same constituents as the constituents described in FIG. 3 are denoted by the same reference numerals, and description thereof will be omitted.

In the configuration of FIG. 1, as described above, the belt layer 14 includes the pair of cross belts 141, 142, the belt cover 143, the pair of belt edge covers 144, 144, and the supplemental belt 145. The cord angles θ41, θ42 of the cross belts 141, 142 have mutually different signs and are in the range of 15 degrees or more and 55 degrees or less in the absolute value.

As illustrated in FIG. 3, the supplemental belt 145 is layered on the outer side of the pair of cross belts 141, 142 in the radial direction. The cord angle θ45 of the supplemental belt 145 has a sign different from that of the cord angle θ42 of the adjacent cross belt 142 and is in the range of 15 degrees or more and 80 degrees or less in the absolute value with respect to the tire circumferential direction. Therefore, the supplemental belt 145 constitutes the third cross belt layered on the pair of cross belts 141, 142. Further, the width Wb5 of the supplemental belt 145 is wider than the width Wb2 of the adjacent cross belt 142, is in the range 1.03≤Wb2/Wb2≤1.40 with respect to the width Wb2, and preferably in the range 1.05≤Wb5/Wb2≤1.25. For this reason, the end portion of the supplemental belt 145 is disposed to be offset in the tire width direction with respect to the end portion of the adjacent cross belt 142. As a result, the suppression effect of the outer diameter growth of the tire by the supplemental belt is effectively obtained, and the durability of the belt layer 14 is improved.

On the other hand, in the configuration of FIG. 9, the supplemental belt 145 is layered on the inner side of the pair of cross belts 141, 142 in the radial direction and positioned between the cross belt 141 on the radially inner side and the carcass layer 13 (see FIG. 1). The supplemental belt 145 is a so-called large-angle belt, and the cord angle θ45 of the supplemental belt 145 has the same sign as and is larger than the cord angle θ41 of the cross belt 141 on the radially inner side and is in the range 45 degrees or more and 70 degrees or less and preferably 54 degrees or more and 68 degrees or less in the absolute value with respect to the tire circumferential direction. In addition, the width Wb5 of the supplemental belt 145 is in the range 0.60≤Wb5/Wb1≤1.40 and preferably in the range 0.70≤Wb5/Wb1≤1.30 with respect to the width Wb1 of the cross belt 141 on the radially inner side. For this reason, the end portion of the supplemental belt 145 is disposed to be offset in the tire width direction with respect to the end portion of the adjacent cross belt 141. As a result, the suppression effect of the outer diameter growth of the tire by the supplemental belt is effectively obtained, and the durability of the belt layer 14 is improved.

In FIGS. 3 and 9, an angle Δθ (degree) (not illustrated) between the belt cord of the supplemental belt 145 and the belt cord of the cross belt adjacent to the supplemental belt 145 among the pair of cross belts 141, 142 (the cross belt 142 on the radially outer side in FIG. 3 and the cross belt 141 on the radially inner side in FIG. 9) is in the range 10 degrees≤Δθ (degree)≤90 degrees, preferably in the range 20 degrees≤Δθ (degree)≤60 degrees, and more preferably in the range 30 degrees≤Δθ (degree)≤55 degrees. Thus, the outer diameter growth of the tire is effectively suppressed, and the durability of the belt layer 14 is ensured.

The angle Δθ formed by the cord angle described above preferably satisfies the following mathematical formula (26) with respect to the tire outer diameter OD (mm). Here, Wmin=30 and Wmax=330, preferably Wmin=60 and Wmax=220, and more preferably Wmin=90 and Wmax=210.

$$W\min/(OD)^{\wedge}(1/5) \le |\Delta\theta| \le W\max/(OD)^{\wedge}(1/5) \quad (26)$$

The smallest cord angle θmin (degree) (the cord angle θ43 of a belt edge cover 144 in FIGS. 3 and 9) among the cord angles of the effective belt plies 141, 142, 143, 145 constituting the belt layer 14 preferably satisfies the following mathematical expression (27) with respect to the tensile strength Tbt (N/50 mm) of the belt ply having the cord angle θmin. Here, Xmin=3 and Xmax=410, preferably Xmin=3 and Xmax=310, and more preferably Xmin=30 and Xmax=310.

$$X\min/(Tbt)^{\wedge}(1/5) \le \theta\min \le X\max/(Tbt)^{\wedge}(1/5) \quad (27)$$

Further, an angle Δθ12 (degree) formed by the cord angle of the belt ply of the innermost layer and the cord angle of the belt ply of the second layer (an angle formed by the cord angles θ41, θ42 of the pair of cross belts 141, 142 in FIG. 3, and an angle formed by the cord angle θ45 of the supplemental belt 145 and the cross belt 141 on the radially inner side in FIG. 9) is defined. Further, an angle Δθ23 formed by the cord angle of the belt ply of the second layer and the cord angle of the belt ply of the third layer (an angle formed by the cord angle θ42 of the cross belt 142 on the radially outer side and the cord angle θ45 of the supplemental belt 145, and an angle formed by the cord angles θ41, θ42 of the pair of cross belts 141, 142 in FIG. 3) is defined. At this time, these angles Δθ12, Δθ23 (degree) have the relationship 50≤Δθ12+Δθ23≤100. Thus, the outer diameter growth of the tire is effectively suppressed, and the durability of the belt layer 14 is ensured.

Modified Example 2

Figure 10:
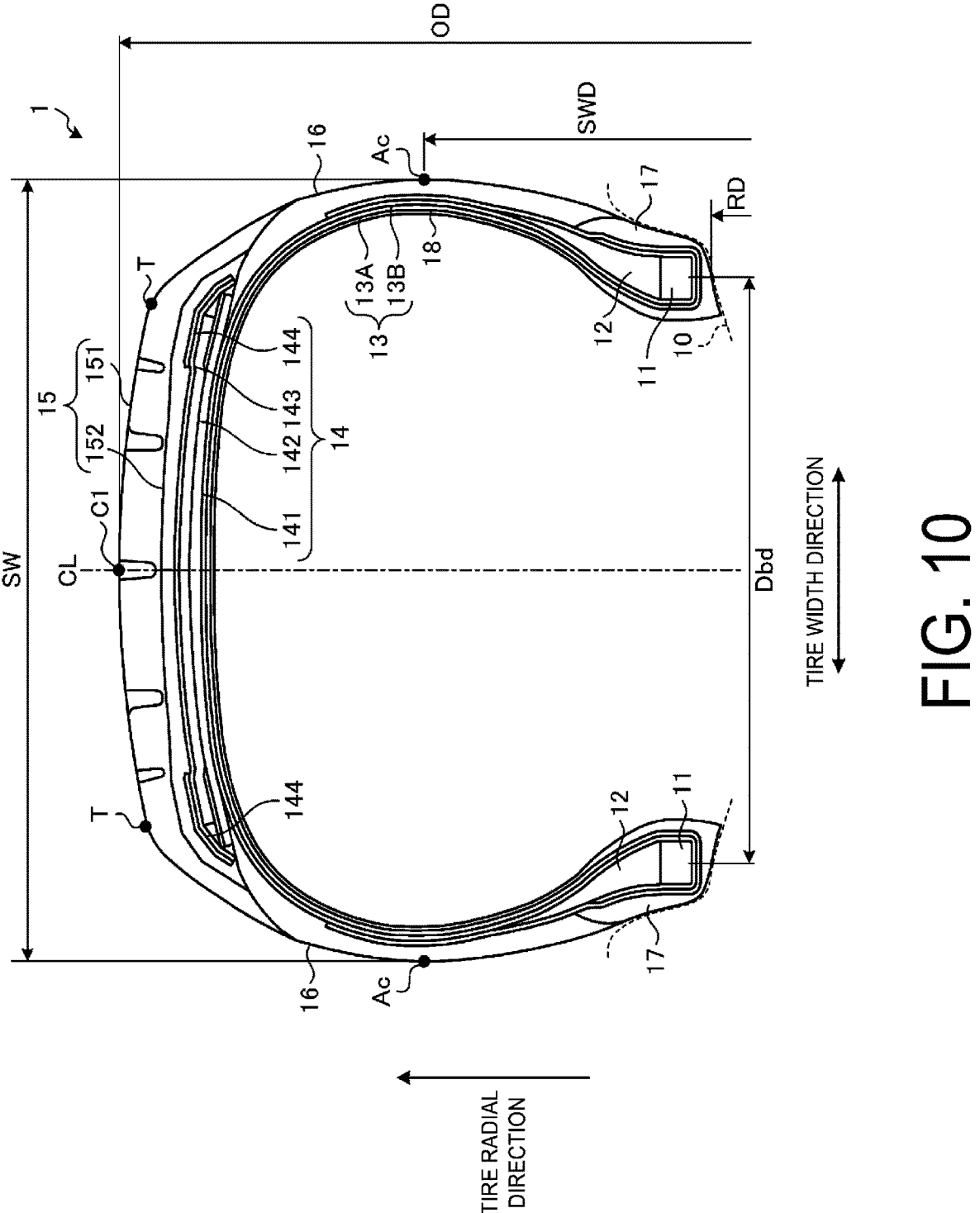
FIG. 10 is an explanatory diagram illustrating Modified Example 2 of the tire illustrated in FIG. 1.

FIG. 10 is an explanatory diagram illustrating Modified Example 2 of the tire 1 illustrated in FIG. 1. In the same drawing, the same constituents as the constituents described in FIG. 3 are denoted by the same reference numerals, and description thereof will be omitted.

In the configuration of FIG. 1, as described above, the belt layer 14 includes the pair of cross belts 141, 142, the belt cover 143, the pair of belt edge covers 144, 144, and the supplemental belt 145.

However, the configuration is not limited thereto, and the supplemental belt 145 may be omitted as illustrated in FIG. 10. Even with such a configuration, the load capacity and the durability of the belt layer 14 can be appropriately ensured.

Modified Example 3

Figure 11:
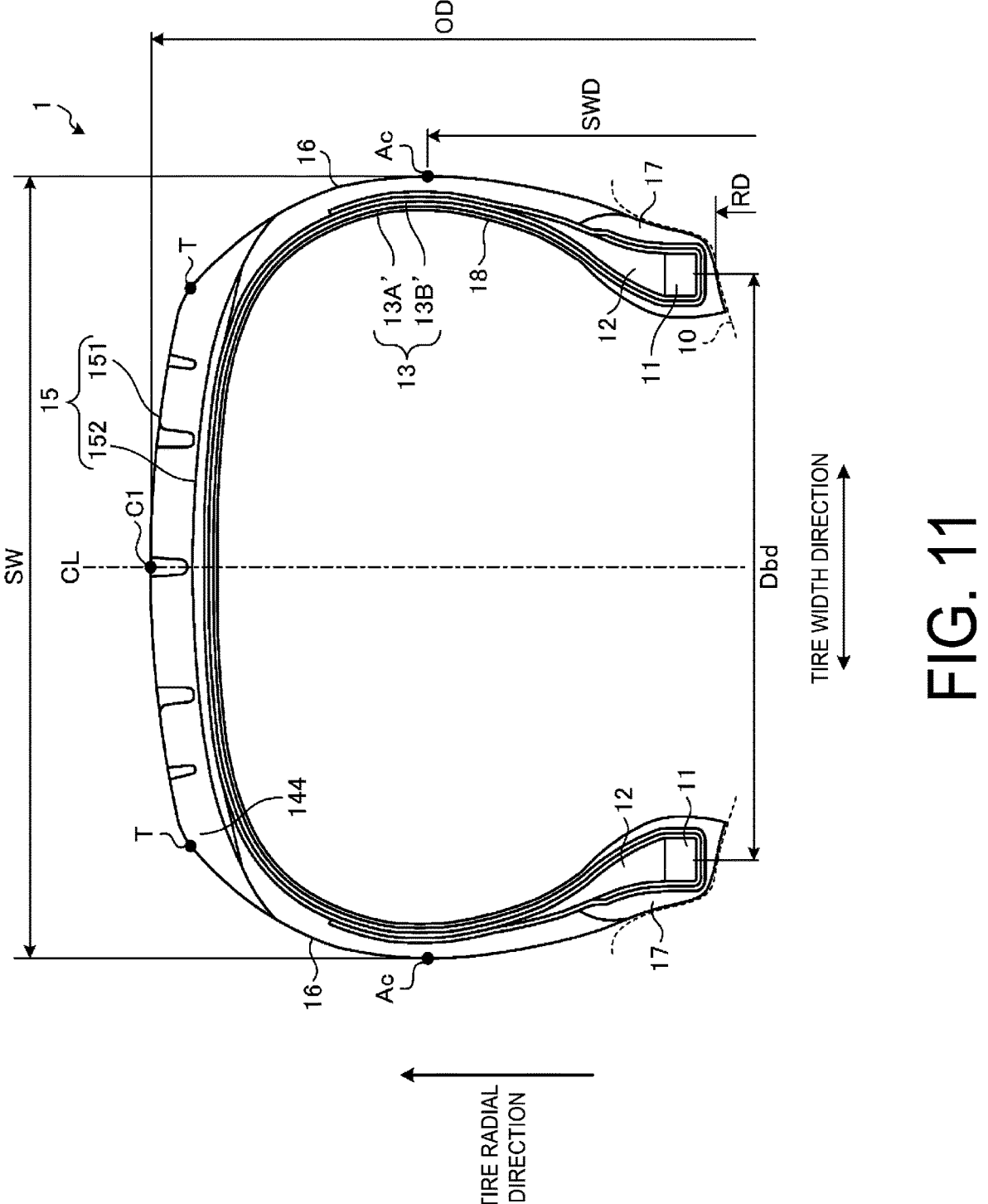
FIG. 11 is an explanatory diagram illustrating Modified Example 3 of the tire illustrated in FIG. 1.

FIG. 11 is an explanatory diagram illustrating the modified example 3 of the tire 1 illustrated in FIG. 1. In the same drawing, the same constituents as the constituents described in FIG. 3 are denoted by the same reference numerals, and description thereof will be omitted.

In the configuration of FIG. 1, as described above, the carcass layer 13 has a radial structure and is constituted by the pair of carcass plies 13A, 13B having the cord angles of 80 degrees or more and 100 degrees or less in the absolute value.

On the other hand, in the configuration of FIG. 11, the carcass layer 13 has a bias structure and includes a pair of carcass plies 13A' and 13B' having cord angles having mutually different signs of 45 degrees or more and 70 degrees or less in the absolute value. Further, the belt layer 14 in the configuration of FIG. 1 is omitted. In this way, the above-described configuration can also be employed for a bias tire.

Effect

As described above, the tire 1 includes the pair of bead cores 11, 11, the carcass layer 13 extended across the pair of bead cores 11, 11, and the belt layer 14 disposed on the outer side of the carcass layer 13 in the radial direction (see FIG. 1). The tire outer diameter OD (mm) is in the range 200≤OD≤660, and the total tire width SW (mm) is in the range 100≤SW≤400. The carcass layer 13 is formed by layering the two layers of the carcass plies 13A, 13B formed by covering organic fiber cords with coating rubbers. The organic fiber cords of the two layers of the carcass plies 13A, 13B have the cord angles in the range of 80 degrees or more and 100 degrees or less with respect to the tire circumferential direction. The tensile strength Tcs (N/50 mm) per the width of 50 mm of each of the two layers of the carcass plies 13A, 13B is in the range 17≤Tcs/OD≤120 with respect to the tire outer diameter OD (mm).

In such a configuration, since the load capacity of the carcass layer 13 is appropriately ensured in the small-diameter tire, there is an advantage of providing the wear resistance performance and the low rolling resistance performance of the tire in a compatible manner. Specifically, the lower limit of the ratio Tcs/OD suppresses tire deformation during use under a high load and ensures the wear resistance performance of the tire. Additionally, use under a high internal pressure is possible, and the rolling resistance of the tire is reduced. In particular, the use of the small-diameter tire under a high internal pressure and a high load is assumed, and therefore the wear resistance performance and the reduction effect of the rolling resistance of the tire described above are significantly obtained. The upper limit of the ratio Tcs/OD suppresses the deterioration of the rolling resistance caused by the increase in the weight of the carcass layer.

In the tire 1, the distance TL (mm) (see FIG. 8) from the center of the organic fiber cord 13*cc* of the carcass ply 13A on the radially inner side among the two layers of the carcass plies 13A, 13B (see FIG. 1) to the tire inner surface is in the range $0.001 \leq TL/OD \leq 0.009$ with respect to the tire outer diameter OD (mm) (see FIG. 1). This has the advantage that the lower limit appropriately suppresses an air leakage, and the upper limit suppresses the increase in tire weight.

Further, in the tire 1, the distance TCSU (mm) (see FIG. 8) from the center of the organic fiber cord 13*cc* of the carcass ply 13A on the radially inner side to the outer surface of the carcass ply 13A on the radially inner side is in the range $0.09 \leq TCSU/TL \leq 1.00$ with respect to the distance TL (mm) from the center of the organic fiber cord 13*cc* of the carcass ply 13A on the radially inner side to the tire inner surface. This has the advantage that the lower limit appropriately suppresses an air leakage, and the upper limit suppresses the increase in tire weight.

In addition, the tire 1 includes the innerliner 18 made of the rubber material, disposed on the tire inner surface, and covering the carcass layer 13 (see FIG. 1). The belt layer 14 is formed by layering the plurality of belt plies 141 to 145 (see FIG. 1) formed by coating the organic fiber cords (the belt cords 14*bc*, see FIG. 8) with coating rubbers 14*cr*. Further, the modulus MC (MPa) at 100% elongation of the coating rubbers 13*cr* of the carcass plies 13A, 13B is in the range $MIL \leq MC \leq MB$ with respect to the modulus MIL (MPa) at 100% elongation of the innerliner 18 and the modulus MB (MPa) at 100% elongation of the coating rubber 14*cr* of the belt ply 141 of the innermost layer (the cross belt 141 on the radially inner side in FIG. 8) of the belt layer 14. As a result, there is an advantage that an air leakage is appropriately suppressed and the durability performance of the tire is ensured.

Additionally, in the tire 1, the modulus MC (MPa) of the coating rubbers 13*cr* of the carcass plies 13A, 13B is in the range $1.00 \leq MC/MIL \leq 3.00$ with respect to the modulus MIL (MPa) of the innerliner 18. This has the advantage that the relationship between the moduli MC, MIL is appropriately set.

In addition, in the tire 1, the modulus MB (MPa) of a coating rubber 14*cr* of the belt ply of the innermost layer (the cross belt 141 on the radially inner side in FIG. 8) of the belt layer 14 is in the range $1.10 \leq MB/MC \leq 2.40$ with respect to the modulus MC (MPa) of the coating rubbers 13*cr* of the carcass plies 13A, 13B. This has the advantage that the relationship between the moduli MB, MC is appropriately set.

Additionally, in the tire 1, the modulus MC (MPa) of the coating rubbers 13*cr* of the carcass plies 13A, 13B is in the range $4.5 \leq MC \leq 12.0$. This has the advantage that the modulus MC is appropriately set.

In the tire 1, the product of the thicknesses TC (mm) (see FIG. 8) of the carcass plies 13A, 13B and the loss tangent tan δ at 60° C. of the coating rubbers 13*cr* of the carcass plies 13A, 13B is in the range $0.08 \leq TC \times \tan \delta \leq 0.45$. This has the advantage that the thicknesses of the carcass plies 13A, 13B are appropriately set.

Further, in the tire 1, the belt layer 14 is formed by layering the plurality of belt plies 141 to 145 formed by coating the organic fiber cords (the belt cords 14*bc*, see FIG. 8) with the coating rubbers 14*cr* (see FIG. 1). The peel strength Hpp (N/25 mm) per the width of 25 mm between the carcass ply 13B of the outermost layer of the carcass layer 13 and the belt ply of the innermost layer of the belt layer 14 (the cross belt 141 on the radially inner side in FIG. 8) is in the range $90 \leq Hpp/TCB \leq 300$ with respect to the distance TCB (mm) from the center of the outer diameter of the carcass cord 13*cc* of the carcass ply 13B to the center of the outer diameter of the belt cord 14*bc* of the belt ply 141. As a result, there is an advantage that the durability of the tire is ensured.

In the tire 1, each of the two layers of the carcass plies 13A, 13B includes the body portion 131 extending along the tire inner surface and the turned-up portion 132 turned up outer side in the tire width direction so as to wrap around the bead cores 11 and extends in the tire radial direction (see FIG. 2). The radial height Hcs (mm) from the measurement point of the rim diameter RD to the end portion of the turned-up portion 132 of the carcass layer 13 is defined. At this time, the radial height Hcs (mm) of the turned-up portion 132 of at least one carcass ply (the carcass ply 13A on the radially inner side in FIG. 2) is in the range $0.49 \leq Hcs/SH \leq 0.80$ with respect to the tire cross-sectional height SH (mm) (see FIG. 2). Thus, there is an advantage that the radial height Hcs of the turned-up portion 132 of the carcass layer 13 is made appropriate. Specifically, the lower limit ensures the load capacity of the tire side portion, and the upper limit suppresses the deterioration of the rolling resistance caused by the increase in the weight of the carcass layer.

Additionally, in the tire 1, the belt layer 14 is formed by layering the pair of cross belts 141, 142 formed by coating steel cords with coating rubbers and having the cord angles (θ41, θ42; see FIG. 3) having the mutually different signs of 15 degrees or more and 55 degrees or less with respect to the tire circumferential direction (see FIG. 1). Further, the tensile strength Tbt (N/50 mm) per the width of 50 mm of each of the pair of cross belts 141, 142 is in the range $25 \leq Tbt/OD \leq 250$ with respect to the tire outer diameter OD (mm). As a result, there is an advantage that the respective load capacities of the pair of cross belts 141, 142 are appropriately ensured.

The tire 1 includes the pair of bead cores 11, 11, the carcass layer 13 extending between the bead cores 11, 11, and the belt layer 14 disposed on the outer side of the carcass layer 13 in the radial direction (see FIG. 11). The tire outer diameter OD (mm) is in the range $200 \leq OD \leq 660$. The total tire width SW (mm) is in the range $100 \leq SW \leq 400$. The carcass layer 13 is formed by layering the two layers of the carcass plies 13A', 13B' formed by coating organic fiber cords with coating rubbers. The organic fiber cords of the two layers of the carcass plies 13A', 13B' have cord angles having mutually different signs and in the range 45 degrees or more and 70 degrees or less with respect to the tire circumferential direction. The tensile strength Tcs (N/50 mm) per the width of 50 mm of each of the two layers of the carcass plies 13A, 13B is in the range 17≤Tcs/OD≤120 with respect to the tire outer diameter OD (mm).

In such a configuration, since the load capacity of the carcass layer 13 is appropriately ensured in the small-diameter tire, there is an advantage of providing the wear resistance performance and the low rolling resistance performance of the tire in a compatible manner.

EXAMPLES

FIGS. 12A to 14C are tables showing results of performance tests of tires according to embodiments of the technology.

In the performance tests, (1) low rolling resistance performance (fuel economy consumption rate), (2) wear resistance performance, and (3) load durability performance were evaluated for a plurality of types of test tires. As an example of the small-diameter tire, test tires having two types of tire sizes are used. Specifically, [A] a test tire having a tire size of 235/45R10 is mounted on a rim having a rim size of 10×8, and [B] a test tire having a tire size of 145/80R12 is mounted on a rim having a rim size of 12×4.00B.

(1) In the evaluation for the low rolling resistance performance, an internal pressure of 230 kPa and a load of 4.2 kN are applied to the test tire [A], and an internal pressure of 80% of the prescribed internal pressure of JATMA and a load of 80% of the prescribed load of JATMA are applied to the test tire [B]. In addition, a four wheeled low-floor vehicle with the test tires mounted on all wheels travels 50 rounds on a test course having a total length of 2 km at a speed of 100 km/h. Thereafter, the fuel economy consumption rate (km/l) is calculated and evaluated. In the evaluation, the results are expressed as index values and evaluated, with Comparative Example being assigned as the reference (100). The larger the value is, the smaller the fuel economy consumption rate is and the rolling resistance tends to decrease, which are preferable.

(2) In the evaluation for wear resistance performance, an internal pressure of 230 kPa and a load of 4.2 kN are applied to the test tire [A], and an internal pressure of 80% of the prescribed internal pressure of JATMA and a load of 80% of the prescribed load of JATMA are applied to the test tire [B]. In addition, a four wheeled low-floor vehicle with the test tires mounted on all wheels travels 10000 km on a dry road surface of a test course. Thereafter, the amount of wear and the degree of uneven wear of each tire are measured and evaluated. The results are expressed as index values and evaluated, with Comparative Example being assigned as the reference (100). In the evaluation, larger values are preferable.

(3) In the evaluation for durability performance, an indoor drum testing machine having a drum diameter of 1707 mm is used, an internal pressure of 230 kPa and a load of 4.2 kN are applied to the test tire [A], and an internal pressure of 80% of the prescribed internal pressure of JATMA and a load of 88% of the prescribed load of JATMA are applied to the test tire [B]. The travel distance until tire failure is measured while increasing the load by 13% every 2 hours at the travel speed of 81 km/h. Then, the results are expressed as index values and evaluated, with Comparative Example being assigned as the reference (100). In this evaluation, larger values are preferable.

The test tire of Example has the structure illustrated in FIG. 1, and includes the pair of bead cores 11, 11, the carcass layer 13 formed of the pair of carcass plies 13A, 13B, the pair of cross belts 141, 142, the belt layer 14 formed of the belt cover 143, the pair of belt edge covers 144, 144, and the supplemental belt 145, the tread rubber 15, the sidewall rubber 16, and the rim cushion rubber 17. The angle of the carcass cord (not illustrated) of the carcass layer 13 is 90 degrees, and the angles of the respective belt plies (see FIG. 3) of the belt layer 14 are θ41=20 degrees, θ42=−20 degrees, θ43=θ44=0 degrees, and θ45=20 degrees.

In the test tire of Comparative Example, the tire outer diameter OD=531 mm, the total tire width SW=143 mm, and the tire ground contact width TW=123 mm in the test tire of Example 1, and the test tire is mounted on a rim having a rim size of 12.

As shown by the test results, it is found that the test tires of Examples provide the low rolling resistance performance, the wear resistance performance, and the durability performance of the tire in a compatible manner.

The invention claimed is:

1. A tire, comprising:

a pair of bead cores; and a carcass layer extending between the bead cores, the carcass layer having a bias structure; and a tire outer diameter OD (mm) being in a range 200≤OD≤660, a total tire width SW (mm) being in a range 100≤SW≤400, the carcass layer being formed by layering two layers of carcass plies formed by covering organic fiber cords with coating rubbers, the organic fiber cords of the two layers of the carcass plies having cord angles having mutually different signs in a range of 45 degrees or more and 70 degrees or less with respect to a tire circumferential direction, and a tensile strength Tcs (N/50 mm) per a width of 50 mm of each of the two layers of the carcass plies being in a range 17≤Tcs/OD≤120 with respect to the tire outer diameter OD (mm).

2. A tire, comprising:

a pair of bead cores;

a carcass layer extending between the bead cores; and a belt layer disposed on an outer side of the carcass layer in a radial direction, a tire outer diameter OD (mm) being in a range 200≤OD≤660, a total tire width SW (mm) being in a range 100≤SW≤400, the total tire width SW (mm) being in a range 0.26≤SW/OD≤0.84 with respect to the tire outer diameter OD (mm), the carcass layer being formed by layering two layers of carcass plies formed by covering organic fiber cords with coating rubbers, the organic fiber cords of the two layers of the carcass plies having cord angles in a range of 80 degrees or more and 100 degrees or less with respect to a tire circumferential direction, and a tensile strength Tcs (N/50 mm) per a width of 50 mm of each of the two layers of the carcass plies being in a range 17≤Tcs/OD≤120 with respect to the tire outer diameter OD (mm).

3. The tire according to claim 2, wherein a distance TL (mm) from a center of the organic fiber cord of the carcass ply on a radially inner side among the two layers of the carcass plies to a tire inner surface is in a range 0.001≤TL/OD≤0.009 with respect to the tire outer diameter OD (mm).

4. The tire according to claim 2, wherein a distance TCSU (mm) from a center of the organic fiber cord of the carcass ply on a radially inner side to an outer surface of the carcass ply on the radially inner side is in a range 0.09≤TCSU/TL≤1.00 with respect to a distance TL (mm) from the center of the organic fiber cord of the carcass ply on the radially inner side to a tire inner surface.

5. The tire according to claim 2, wherein a product of a thicknesses TC (mm) of the carcass ply and a loss tangent tan δ at 60° C. of the coating rubber of the carcass ply is in a range 0.08≤TC×tan δ≤0.45.

6. The tire according to claim 2, wherein the belt layer is formed by layering a plurality of belt plies formed by coating organic fiber cords with coating rubbers, and a peel strength Hpp (N/25 mm) per a width of 25 mm between the carcass ply of an outermost layer of the carcass layer and the belt ply of an innermost layer of the belt layer is in a range 90≤Hpp/TCB≤300 with respect to a distance TCB (mm) from a center of an outer diameter of the carcass cord of the carcass ply to a center of an outer diameter of the belt cord of the belt ply.

7. The tire according to claim 2, wherein each of the two layers of the carcass plies comprises a body portion and a turned-up portion, the body portion extends along a tire inner surface, and the turned-up portion is turned up to an outer side in a tire width direction so as to wrap around the bead cores and extends in a tire radial direction, and a radial height Hcs (mm) from a measurement point of a rim diameter RD to an end portion of the turned-up portion is defined, and the radial height Hcs (mm) of the turned-up portion of at least the one carcass ply is in a range 0.49≤Hcs/SH≤0.80 with respect to a tire cross-sectional height SH (mm).

8. The tire according to claim 2, wherein the belt layer is formed by layering a pair of cross belts formed by coating steel cords with coating rubbers having cord angles having mutually different signs and 15 degrees or more and 55 degrees or less with respect to the tire circumferential direction, and a tensile strength Tbt (N/50 mm) per a width of 50 mm of each of the pair of cross belts is in a range 25≤Tbt/OD≤250 with respect to the tire outer diameter OD (mm).

9. The tire according to claim 2, comprising an innerliner made of a rubber material, disposed on a tire inner surface, and covering the carcass layer, wherein the belt layer is formed by layering a plurality of belt plies formed by coating organic fiber cords with coating rubbers, and a modulus MC (MPa) at 100% elongation of the coating rubber of the carcass ply is in a range MIL≤MC≤MB with respect to a modulus MIL (MPa) at 100% elongation of the innerliner and a modulus MB (MPa) at 100% elongation of the coating rubber of the belt ply of an innermost layer of the belt layer.

10. The tire according to claim 9, wherein the modulus MC (MPa) of the coating rubber of the belt ply is in a range 1.00≤MC/MIL≤3.00 with respect to the modulus MIL (MPa) of the innerliner.

11. The tire according to claim 9, wherein the modulus MB (MPa) of the coating rubber of the belt ply on the innermost layer is in a range 1.10≤MB/MC≤2.40 with respect to the modulus MC (MPa) of the coating rubber of the carcass ply.

12. The tire according to claim 9, wherein the modulus MC (MPa) of the coating rubber of the carcass ply is in a range 4.5≤MC≤12.0.

* * * * *